(12) United States Patent
Lightfoot et al.

(10) Patent No.: US 10,739,631 B2
(45) Date of Patent: Aug. 11, 2020

(54) EWRITER WITH ENHANCED LINE ACUITY

(71) Applicant: Kent Displays, Inc., Kent, OH (US)

(72) Inventors: Mark Lightfoot, Kent, OH (US); Erica Montbach, Kent, OH (US); Forrest Nicholson, Kent, OH (US); Clinton Braganza, Kent, OH (US)

(73) Assignee: Kent Displays Inc., Kent, OH (US)

( * ) Notice: Subject to any disclaimer, the term of this patent is extended or adjusted under 35 U.S.C. 154(b) by 0 days.

(21) Appl. No.: 16/040,968

(22) Filed: Jul. 20, 2018

(65) Prior Publication Data
US 2020/0026106 A1    Jan. 23, 2020

(51) Int. Cl.
| | | |
|---|---|---|
| *G02F 1/1334* | (2006.01) | |
| *G02F 1/137* | (2006.01) | |
| *G02F 1/1335* | (2006.01) | |
| *C09J 7/25* | (2018.01) | |
| *B43L 1/00* | (2006.01) | |

(52) U.S. Cl.
CPC ............. *G02F 1/1334* (2013.01); *B43L 1/00* (2013.01); *C09J 7/255* (2018.01); *G02F 1/137* (2013.01); *G02F 1/133512* (2013.01); *C09J 2203/318* (2013.01); *C09J 2433/00* (2013.01); *G02F 2202/28* (2013.01); *G02F 2203/02* (2013.01)

(58) Field of Classification Search
CPC .. G02F 1/1334; G02F 1/133512; G02F 1/137; G02F 2203/02; G02F 2202/28; G02F 1/13338; G02F 2001/13312; C09J 7/255; C09J 2433/00; C09J 2203/318; B43L 1/00; G06F 3/0412; G06F 3/0421; G06F 3/044; G06F 3/045; G06F 3/041; G06F 3/0414; G06F 3/0416; G06F 3/0488; G06F 2203/04107; G06F 2203/04103; G06K 11/06
USPC ......................................................... 349/12
See application file for complete search history.

(56) References Cited

U.S. PATENT DOCUMENTS

| | | |
|---|---|---|
| 5,453,863 A | 9/1995 | West et al. |
| 5,493,430 A | 2/1996 | Lu et al. |
| (Continued) | | |

OTHER PUBLICATIONS

U.S. Appl. No. 15/952,471, filed Apr. 13, 2018 (not yet published).
(Continued)

*Primary Examiner* — Shan Liu
(74) *Attorney, Agent, or Firm* — Serbinowski PLLC

(57) ABSTRACT

A liquid crystal writing device with enhanced line acuity includes the following features. Included is a front writing surface. A liquid crystal layer includes a dispersion of cholesteric liquid crystal and polymer, wherein a reflectance of the cholesteric liquid crystal changes in response to pressure applied to the front writing surface so as to form an image on the liquid crystal layer. The liquid crystal layer is disposed between electrically conductive layers. A second of the electrically conductive layers is more distal from the front writing surface than a first of the electrically conductive layers is from the front writing surface. A backing supports the pressure applied to the front writing surface. An adhesive layer is disposed between the second of the electrically conductive layers and the backing. A line acuity of the image has a value of not more than 3.0 determined according to the Line Acuity Measurement Method of this disclosure.

23 Claims, 18 Drawing Sheets

(56) References Cited

U.S. PATENT DOCUMENTS

| | | | |
|---|---|---|---|
| 5,691,795 A | 11/1997 | Doane et al. | |
| 6,104,448 A | 8/2000 | Doane et al. | |
| 8,139,039 B2 | 3/2012 | Schneider et al. | |
| 8,228,301 B2 | 7/2012 | Schneider | |
| 9,116,379 B2 | 8/2015 | Braganza et al. | |
| 9,235,075 B2 | 1/2016 | Montbach et al. | |
| 9,851,612 B2 | 12/2017 | Davis et al. | |
| 2007/0152928 A1* | 7/2007 | Doane | G02F 1/133305 345/87 |
| 2009/0033811 A1 | 2/2009 | Schneider | |
| 2009/0251489 A1* | 10/2009 | Iijima | G06T 11/60 345/619 |
| 2010/0265214 A1 | 10/2010 | Green et al. | |
| 2012/0266508 A1* | 10/2012 | Halper | G09F 15/00 40/591 |
| 2013/0107144 A1* | 5/2013 | Marhefka | G06F 1/3275 349/12 |
| 2013/0314621 A1 | 11/2013 | Montbach et al. | |
| 2015/0124178 A1 | 5/2015 | Khan et al. | |
| 2015/0239220 A1* | 8/2015 | Horiuchi | C09J 7/40 156/249 |
| 2016/0091745 A1* | 3/2016 | Braganza | G02F 1/13718 349/12 |
| 2017/0335144 A1* | 11/2017 | Mitsui | C09J 139/06 |
| 2018/0004352 A1* | 1/2018 | Hanada | G06F 3/0418 |
| 2018/0143475 A1* | 5/2018 | Li | G02F 1/13338 |

OTHER PUBLICATIONS

Wicue liquid crystal eWriter, Jul. 19, 2018, http://wicue.com/chanpin.html.

* cited by examiner

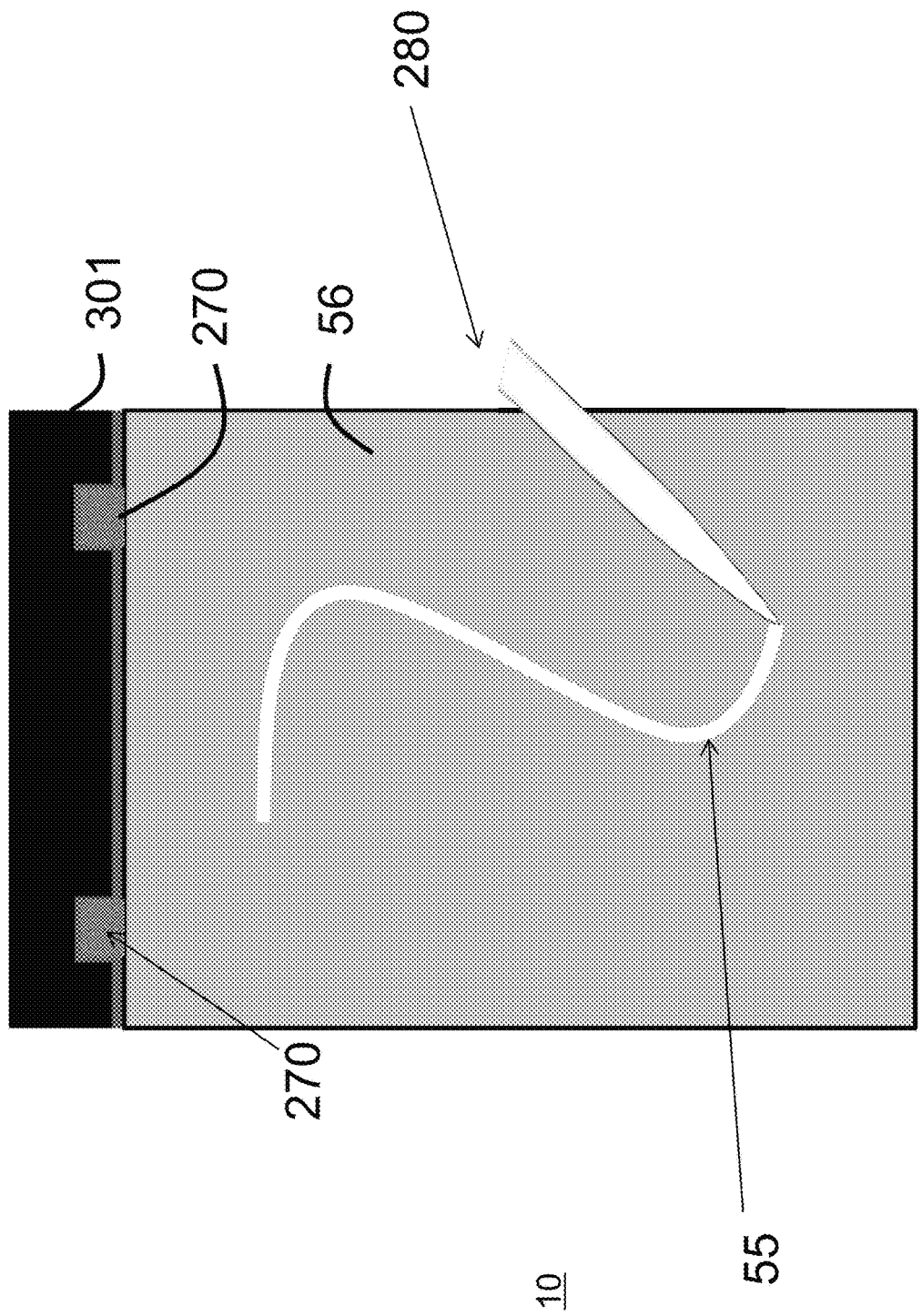

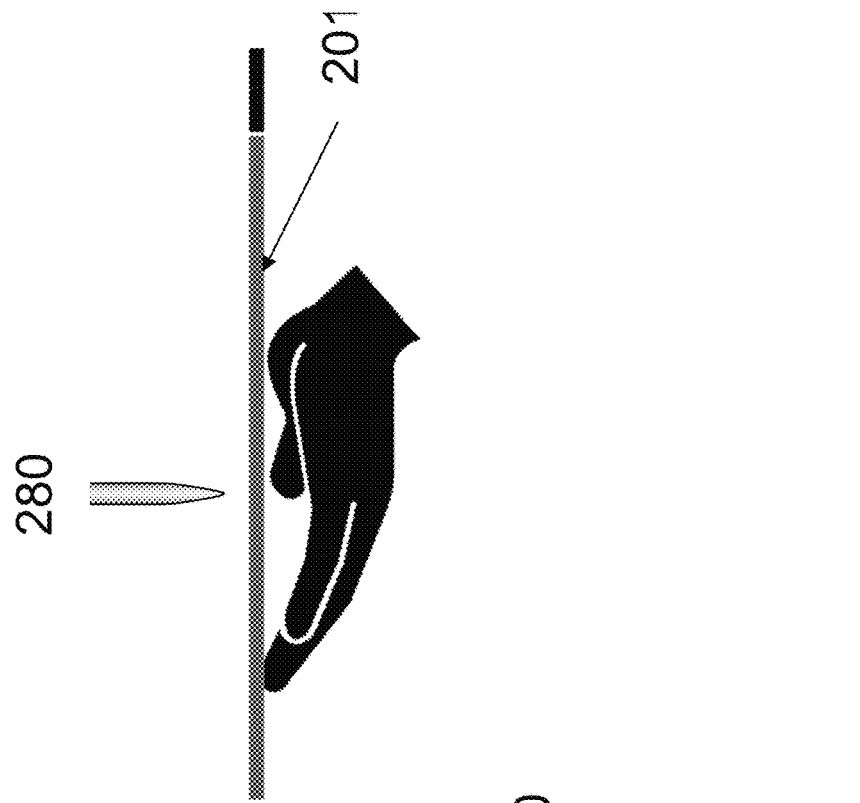
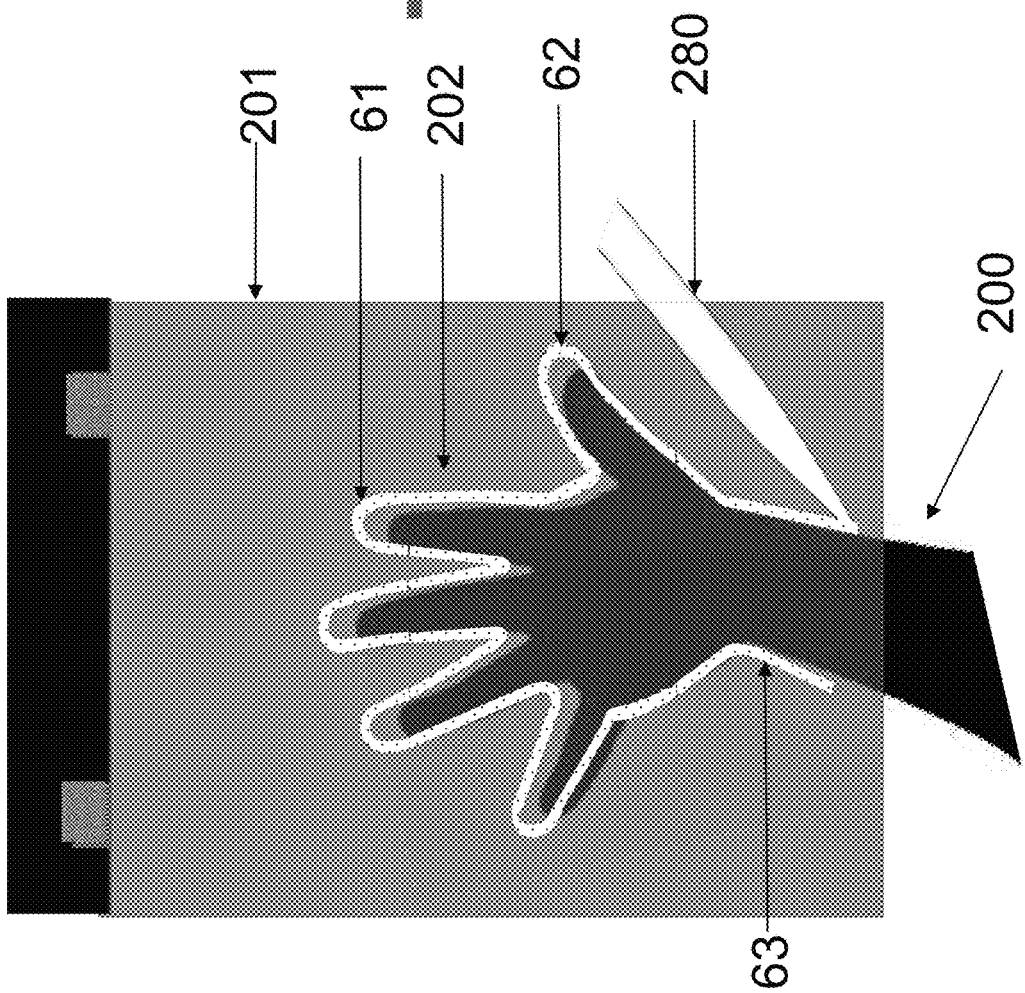

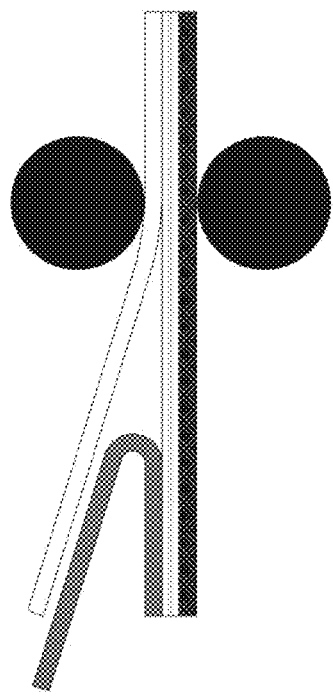
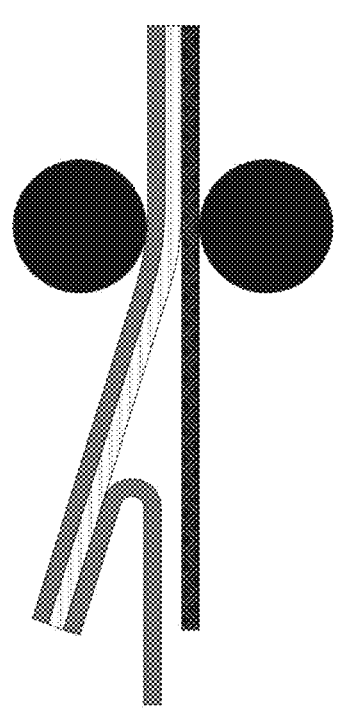
Fig. 15B
Fig. 15A

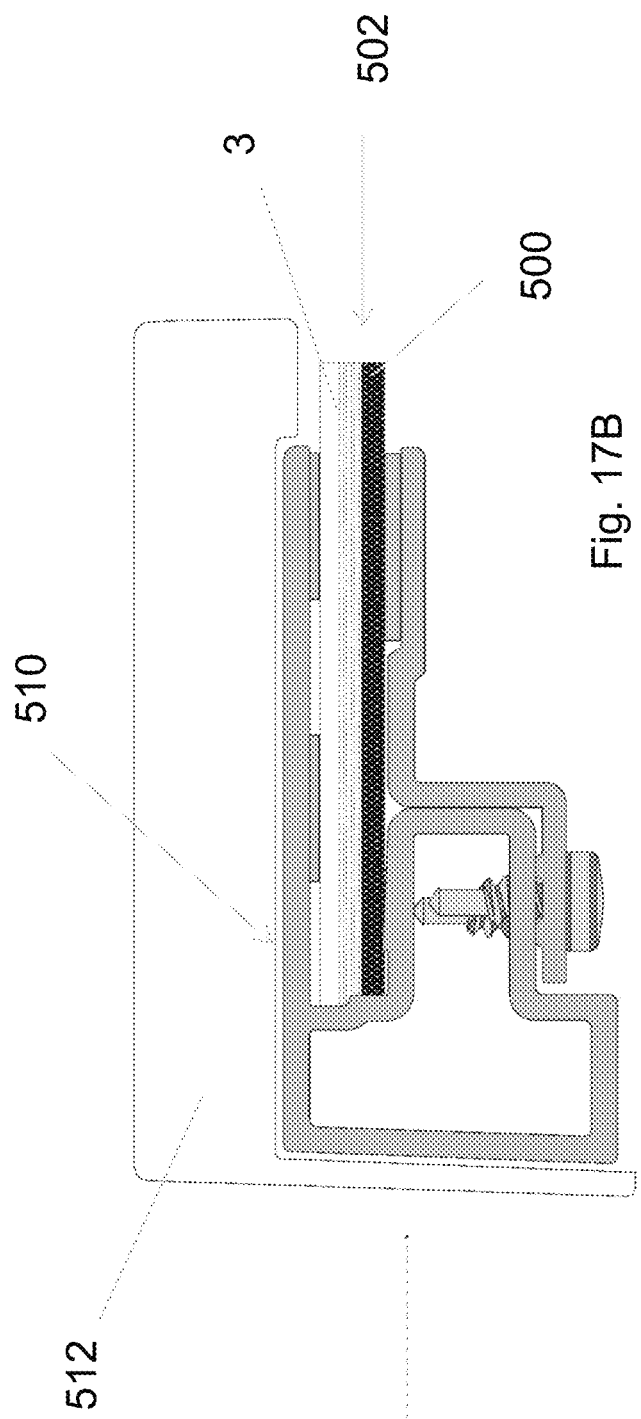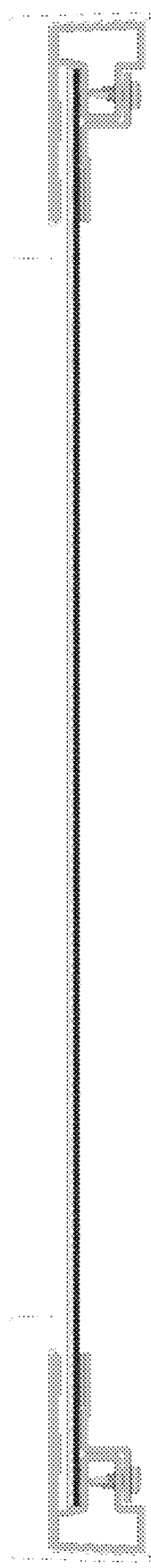
Fig. 17B
Fig. 17A

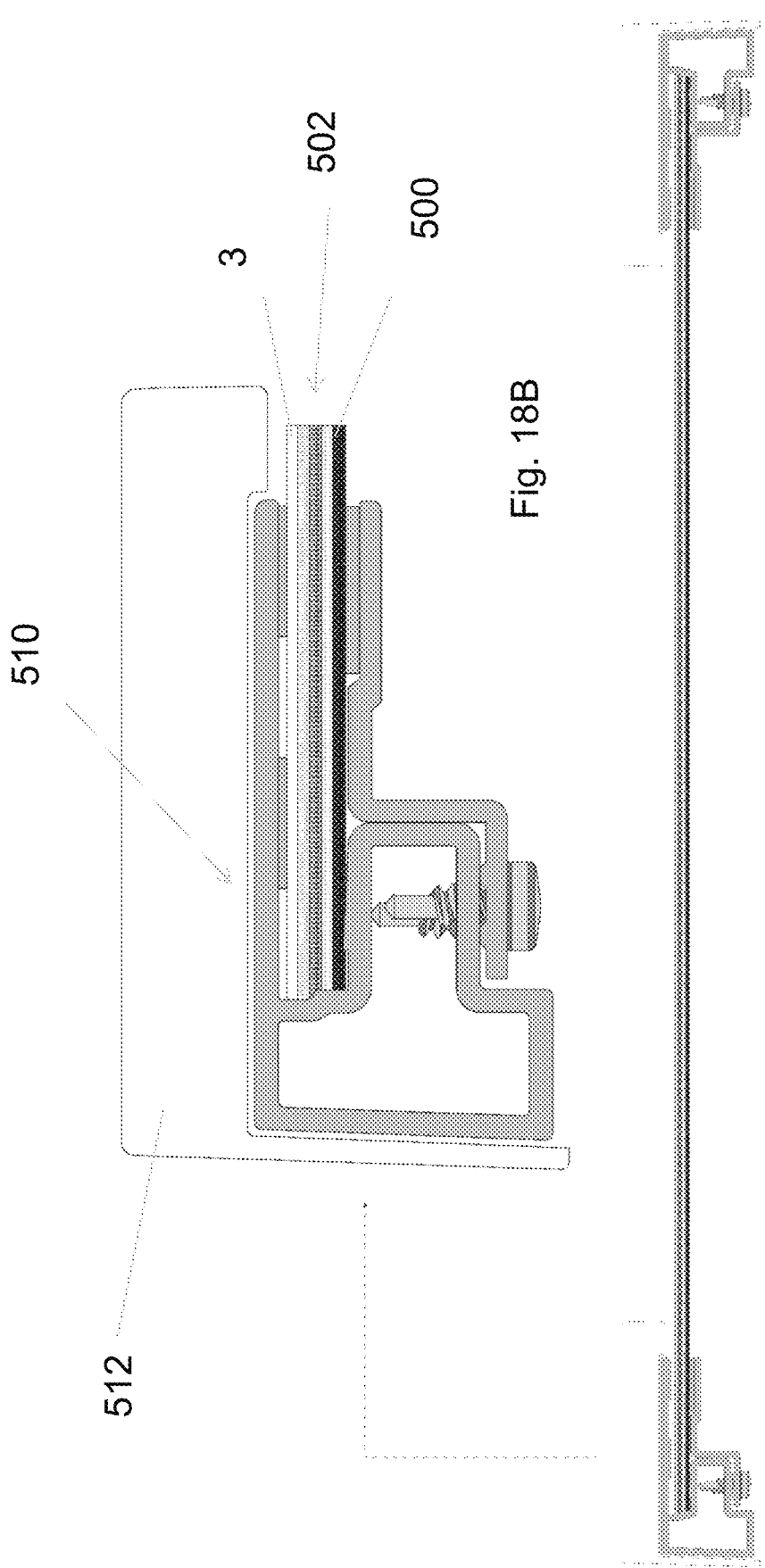

EWRITER WITH ENHANCED LINE ACUITY

BACKGROUND OF THE DISCLOSURE

This disclosure relates generally to liquid crystal writing/drawing devices, and in particular, to Cholesteric Liquid Crystal Displays (ChLCDs) used in such writing/drawing devices.

Toy products are currently on the market such as Doodle Sketch (newer version of Magna Doodle) and Etch-a-Sketch®, both produced by the Ohio Arts Company—that allow children and other users to draw images on the device and to erase these images. The Doodle Sketch requires a specialized stylus (attached by a tether to the device) using a magnetophoretic display. The basic Etch-a-Sketch uses a built in specialized stylus controlled by two knobs to remove aluminum powder from the inside surface of a glass screen. These toy products are bulky, and the toys require a specialized stylus attached to the device. These toys cannot allow the user to freely create multiple images with the natural feel of writing on paper in brilliant color with a single movement of a non-specialized stylus, including a fingernail.

Toys that are electronic writing and drawing devices offer the benefits of multiple uses, neatness (i.e., no cleanup of paint, broken crayons, ink stains or pencil shavings) and ruggedness. Consumers currently choose toys that are electronic devices for a wide variety of features and, until very recently, benefits related to handwriting and drawing by hand have not been a major factor. In addition, consumers seeking a toy that is a low cost, rugged device to provide to their children for entertainment—such as on long automobile trips—are often frustrated and overwhelmed by the cost, complexity and fragility of electronic devices. Many electronic devices can be easily damaged or mishandled by children in their exuberance of use, or require extensive preparation by responsible adults to limit inappropriate access by children using the device. Many toys that mimic the look of more expensive devices but without their features quickly bore the child user.

The market for toys that are low-cost, low-power electronic devices that capture and display writing and drawing by hand continues to grow and is increasingly competitive. Consumers desire rugged devices that are easy to use and capture the experience of handwriting similar to the feel of writing with a pen on paper. In a world that strives for sustainability of natural resources, consumers and manufacturers seek alternatives to paper and paper-based solutions for easily and inexpensively capturing hand-written or hand-drawn ideas, information and images. Consumers also want their electronic devices to capture and present text and images in vibrant, unique and colorful ways, to mimic the use of pens and paper of different colors, without the expense, mess and single-use of pen and paper. Device ruggedness and visual appeal are particularly important for toys to appeal to children and to consumers purchasing products for children for both education and entertainment purposes.

In 2010, the Boogie Board® pressure sensitive cholesteric liquid crystal writing tablet, also referred to as an eWriter, of Kent Displays Inc. appeared on the market in which a pointed stylus or the fingernail can be used to write or trace an image on the surface of the tablet as described in U.S. Pat. Nos. 6,104,448 and 9,116,379, both patents being incorporated herein by reference. In a cholesteric liquid crystal writing tablet, the liquid crystal is sandwiched between two substrates including interior electrode layers, that are spaced to a particular cell gap. The front substrate is flexible and the bottom substrate is either opaque or semitransparent. Within the cell gap is a bistable cholesteric liquid crystal layer which can exhibit two textures, an essentially transparent (focal conic) texture and a color reflective (planar) texture. The spacing of the cell gap is usually set by plastic or glass spacers that are either cylindrical or spherical in shape. The tablet is initialized by applying voltage pulses to the electrodes to electrically drive the cholesteric material to the focal conic state. When one presses on the top substrate with a pointed stylus or finger, the liquid crystal is locally displaced. Flow induced in the liquid crystal changes its optical texture from essentially transparent to a brilliant reflective color at the location of the stylus. The reflective color contrasts well with the opaque or semitransparent color below the liquid crystal layer. An image traced by the stylus or fingernail will remain on the tablet indefinitely without application of a voltage until erased. Erasure is accomplished by applying a voltage pulse to the electrodes that drives the cholesteric liquid crystal from its color reflective state back to its essentially transparent state.

The above described principle known as Mode B is disclosed in more detail in U.S. Pat. No. 6,104,448, which is incorporated herein by reference. Another mode of operation, Mode A, can be used for the erasure of a selected portion of the image as disclosed in U.S. Pat. No. 8,139,039, which is incorporated herein by reference, and is applicable to the pressure sensitive liquid crystal devices of the present disclosure. The mode of operation with a color reflective background is termed Mode A whereas the other mode with an essentially transparent background is termed Mode B. In Mode A the tablet is initialized by electrically driving the pressure sensitive liquid crystal device to the color reflective texture with a voltage pulse or pulses. Then with a continuous voltage applied to the electrodes of an appropriate value, one can write images by driving the cholesteric material to the substantially transparent texture with the pressure of a pointed stylus.

The commercial Boogie Board® eWriter, operated in Mode B, has the color black for the fixed opaque light absorbing background. The dark black background offers high contrast for the color reflective image written on the eWriter. As disclosed in U.S. Pat. No. 5,493,430, which is incorporated herein by reference, other opaque colors may also be used for the fixed background of a cholesteric liquid crystal eWriter. The color of the background additively mixes with the color reflected by the cholesteric liquid crystal to present a different color than that of the cholesteric liquid crystal. There may be multiple colors on the background and those colors may be patterned. As an example, the pattern could be lines offering a lined tablet for convenience in writing text similar to a ruled paper tablet as described in U.S. Patent Application Publication No. 2013/0314621, which is incorporated herein by reference.

Prior art FIG. 1 illustrates a top view of an eWriter in mode B. The prior art procedure of writing an image on the eWriter is to first erase all previous images by applying an erasing voltage to drive the entire cell initially to the focal conic texture. The value of the voltage or magnitude of a voltage pulse to do this is well known in the art of making cholesteric liquid crystal displays, e.g., U.S. Pat. Nos. 5,453,863 and 5,691,795, both patents which are incorporated herein by reference. Typically, when a black back layer is used the cholesteric liquid crystal initially in the focal conic state appears dark because the cholesteric liquid crystal is weakly scattering or substantially transparent and reveals the black back layer. The pressure from the stylus 280 on the writing surface of the eWriter, without further application of voltage, induces flow that causes the liquid crystal to reorient to the bright planar texture. The cholesteric liquid crystal in the planar state has a certain bright color and a reflectance value at the wavelength of peak reflectance. The liquid crystal of the viewing area can be erased when switched back to the focal conic texture by applying the erasing voltage.

FIGS. 2A and 2B illustrate a top and side view, respectively, of a Boogie Board® eWriter with a semitransparent back layer that enables articles or back patterns to be viewed through the eWriter which can enable tracing, writing and drawing on the eWriter over the article or back pattern. This is described in U.S. Pat. No. 9,116,379, entitled "Electronic Display with Semitransparent Back Layer," which is incorporated herein by reference in its entirety. The semitransparent back layer or back pattern, affects the image reflected by the liquid crystal through additive and/or subtractive color mixing. Here the article is a hand below the eWriter and the user is tracing the hand on the eWriter.

Many current eWriters are constructed to have a handheld size (e.g., current Boogie Board® eWriters by Kent Displays shown in FIGS. 1, 2A and 2B). This device is designed to have a pressure sensitivity that enables producing suitable written lines much like writing or drawing with a pen on a piece of paper without registering the palm of the hand on the eWriter. A stylus can be used to apply the pressure that changes liquid crystal reflectance. The stylus typically does not contain ink.

FIG. 3 shows a side view of the Prior Art Boogie Board® eWriter 10 and how the display subassembly 400 is supported. A bezel 402 with pressure sensitive adhesive 404 located at the perimeter of the eWriter device adheres to the front of the display subassembly and case 406. The display subassembly 400 is fixed in position by being trapped between the bezels 402 and the case 406, and is held in place with PSA 404.

Dry erase whiteboards have a large format and can be hung on a wall for writing and drawing for viewing by many people at once. However, these devices require use of markers and a dry eraser, which is costly and messy. Erasing often leaves a marker residue or after-image that can be difficult to remove. In addition, it is difficult to save the image written on a dry erase whiteboard, other than taking a photograph of it, which is cumbersome.

Large format Smart Board writing devices exist, such as in classrooms, but are very expensive and have complicated electronics.

A display subassembly of a large-format cholesteric liquid crystal writing device, if left free-floating over a back surface of the device, will eventually sag and pull away from the back surface, creating an undesirable look and writing experience. Current liquid crystal writing devices on the market, may attach the back case of the device to a back layer of the display subassembly using adhesive. However, such writing devices suffer from undesirable line acuity or line sharpness which detracts from the quality of the device and writing experience.

There is a need for a better technology to allow consumers of all ages to easily and repeatedly write, draw and immediately/simultaneously display to share contrasting, vibrant multiple color text and images for creative, educational and therapeutic uses. The present disclosure is directed to an eWriter having enhanced line acuity with other desirable features and characteristics that are detailed in the subsequent Summary of the Disclosure, Detailed Description, the accompanying drawings and the appended claims.

SUMMARY OF THE DISCLOSURE

This disclosure is directed to an electronic liquid crystal writing device (eWriter) with a pressure-sensitive rugged surface that users can write or draw upon with clear and crisp lines, in a form of a hand held size eWriter, and even a large format eWriter which can be constructed and arranged for viewing by several people at once. The eWriter of this disclosure enables different and enhanced functionality compared to a dry erase whiteboard, including the features of electronic erase free of any residues or after-images, and a stylus that does not dispense ink. The eWriter of this disclosure avoids the problems of sagging and pulling away of the display from the backing of the device, while providing a very pleasing look and writing experience that imitates the look and feel of a pen on paper. The subject eWriter avoids the waste of one time paper use and the waste and mess of dry erase markers and erasers. The eWriter of this disclosure advantageously exhibits better line acuity or sharpness than other cholesteric liquid crystal eWriters on the market today.

In general, a first aspect of the disclosure features a liquid crystal writing device with enhanced line acuity, comprising the following features. Included in the writing device is a front writing surface. A liquid crystal layer includes a dispersion of cholesteric liquid crystal and polymer, wherein a reflectance of the cholesteric liquid crystal changes in response to pressure applied to the front writing surface so as to form an image on the liquid crystal layer. The writing device includes electrically conductive layers between which the liquid crystal layer is disposed. A second of the electrically conductive layers is more distal from the front writing surface than a first of the electrically conductive layers is from the front writing surface. A backing supports the pressure applied to the front writing surface. An adhesive layer is disposed between the second of the electrically conductive layers and the backing. A line acuity of the image is not more than 3.0, as determined by the Line Acuity Measurement Method of this disclosure described below.

In particular examples, the liquid crystal writing device includes a light absorbing layer that absorbs light passing through the liquid crystal layer, and the adhesive layer is disposed between the light absorbing layer and the backing. In some aspects, the adhesive layer can be referred to as a pressure sensitive adhesive (PSA). The present inventors have found that some PSAs used for attaching the backing can cause an undesirable fuzzy or muddled look to the written line on the liquid crystal layer, which occurs in some cases if the PSA is too soft or has a rough surface topology. The present disclosure allows the eWriter to achieve enhanced line acuity. The eWriter is designed to include, for example, a suitable PSA. In addition, the eWriter can be designed to have greater pressure sensitivity than current Boogie Board® eWriters (i.e., a wider line thickness is achieved with a given applied pressure).

The eWriter of this disclosure can be erased using conventional erase voltage pulses and/or electronics, for example, using the erase voltage pulses of the Boogie Board® eWriter or using an appropriate erase voltage waveform and/or erase electronics disclosed in Applicant's U.S. patent application Ser. No. 15/952,471, entitled "Liquid Crystal Writing Device With Slow Discharge Erase," which is incorporated herein by reference in its entirety.

The eWriter of this disclosure advantageously can be electronically erased entirely, all at once, and may be designed for permitting select erase of images, for example, as disclosed in U.S. Pat. No. 8,139,039, which is incorporated herein by reference in its entirety.

The subject eWriter can electronically capture images using technology, for example, as disclosed in U.S. patent application publication PG Pub. No. US 2010/0265214, entitled "Writing Tablet Information Recording Device," and U.S. patent application publication PG Pub. No. US 2015/0124178, "Electronic Writing Device with Dot Pattern Recognition System," which are incorporated herein by reference in their entireties.

Referring now to more specific features of the first aspect of this disclosure, the line acuity has a value that is not more than 2.0 and, in particular, is not more than 1.1.

In another specific feature the liquid crystal writing device comprises electronics adapted to apply a voltage or at least one voltage pulse across the electrically conductive layers that erases the image.

In yet another specific feature the adhesive layer is a film that includes a first adhesive surface on one side thereof and a second adhesive surface on an opposite side thereof.

In particular, the film can comprise an optically clear acrylic polymer adhesive material that is at least 2 mil in thickness.

In another specific feature the adhesive layer is a tape comprising a carrier film, a first adhesive layer disposed on one side of the carrier film and a second adhesive layer disposed on an opposite side of the carrier film. The second adhesive layer is closer to the front writing surface than the first adhesive layer is to the front writing surface. In yet another feature, the carrier film of the tape has a thickness of at least one mil and comprises Polyethylene Terephthalate (PET) polymer, the first adhesive layer has a thickness of at least one mil and a first peel strength and the second adhesive layer has a thickness of at least one mil and a second peel strength. The first adhesive layer and the second adhesive layer comprise acrylic polymer. The first peel strength is at least 10 times greater than the second peel strength.

In other features the backing includes aluminum clad polymer. The liquid crystal layer includes a dispersion having a pressure sensitivity effective to provide the image with an average line width of at least 1.5 mm, and in particular, at least 2 mm.

Another feature is that the liquid crystal writing device comprises an opaque light absorbing layer that absorbs light passing through the liquid crystal layer.

Another feature is that the liquid crystal writing device comprises a semitransparent back layer that absorbs light passing through the liquid crystal layer.

In another feature the front writing surface includes a front substrate and including a back substrate that supports the second of the electrically conductive layers.

Yet another feature is that the front writing surface, the electrically conductive layers, any substrates, the adhesive layer and the backing are see-through.

The liquid crystal writing device can be designed so that all components of it that share an area with the front writing surface, are see-through. This may be used with an optional further back layer, template or other component or object that provides suitable contrast for viewing the image of the liquid crystal layer.

Reference to the term see-through herein includes only a portion of a component being see-through as well as all of the component being see-through.

A second aspect of this disclosure features a liquid crystal writing device with enhanced line acuity, including the following features. Included is a front writing surface having a surface area that is at least 0.75 ft$^2$. A liquid crystal layer includes a dispersion of cholesteric liquid crystal and polymer, wherein a reflectance of the cholesteric liquid crystal changes in response to pressure applied to the front writing surface so as to form an image on the liquid crystal layer. The image has an average line width of at least 1.5 mm. Electrically conductive layers are included, between which the liquid crystal layer is disposed. A second of the electrically conductive layers is more distal from the front writing surface than a first of the electrically conductive layers is from the front writing surface. A backing supports the pressure applied to the front writing surface. An adhesive layer is disposed between the second of the electrically conductive layers and the backing. A line acuity of the image has a value of not more than 3.0 determined according to the Line Acuity Measurement Method.

Referring now to specific features of the second aspect of the disclosure, the line acuity of the image has a value of not more than 1.1 determined according to the Line Acuity Measurement Method.

In yet another feature the front writing surface has an area of at least 6.0 ft$^2$.

In another feature included is an opaque light absorbing layer that absorbs light passing through the liquid crystal layer.

In another feature included is a semitransparent hack layer that absorbs light passing through the liquid crystal layer.

Another feature is that the front writing surface, the electrically conductive layers, any substrates, the adhesive layer and the backing are see-through.

The liquid crystal writing device can be designed so that all components of it that share an area with the front writing surface, are see-through. This may be used with an optional further back layer, template or other component or object that provides suitable contrast for viewing the image of the liquid crystal layer.

A process for making the liquid crystal writing device of this disclosure, comprises:

a) providing a multi-layer display subassembly comprising the front writing surface, the liquid crystal layer including a dispersion of cholesteric liquid crystal and polymer, the electrically conductive layers between which the liquid crystal layer is disposed, and an optional light absorbing layer that absorbs light passing through the liquid crystal layer;

b) providing the adhesive layer;

c) providing the backing;

d) attaching an exposed first surface of the adhesive layer to the backing to form a backing subassembly;

e) adhering the multilayer display subassembly to an exposed second surface of the adhesive layer of the backing subassembly.

In particular the process comprises applying pressure to at least one of the multilayer display subassembly and the backing subassembly so as to adhere the multilayer display subassembly to the backing subassembly. Further the process includes applying pressure by passing the multilayer display subassembly and the back subassembly between rollers or using a laminator.

The methods of fabrication for adhering the backing of the eWriter provide various advantages, for example, preventing the display subassembly from sagging or ballooning. The methods of making the eWriter disclosed here also provide processing advantages such as backing reworkability and uniform adhesive laydown, as well as aesthetic/yield advantages by reducing the visual effect of particles and maintaining sharp line acuity with the proper adhesive properties.

The specific features discussed above in connection with the first aspect, the second aspect, the features of the method, and the features discussed in the Detailed Description, apply to the first and second aspects above, in any combination.

BRIEF DESCRIPTION OF THE DRAWINGS

FIG. 1 is a top view of a Prior Art cholesteric liquid crystal writing device;

FIG. 2A is a top view of a Prior Art semitransparent, cholesteric liquid crystal writing device and FIG. 2B is a side view thereof;

FIG. 6 is a perspective view of a semitransparent, cholesteric liquid crystal writing device of the disclosure which employs a display subassembly including a semitransparent back layer, an adhesive sheet in the form of a see-through free-film and the backing is see-through;

FIG. 7 is a perspective view of a semitransparent, cholesteric liquid crystal writing device of the disclosure which employs a display subassembly including a semitransparent back layer, an adhesive sheet in the form of a see-through tape and the backing is see-through;

FIG. 8 is a perspective view of a semitransparent, cholesteric liquid crystal writing device of the disclosure which employs a display subassembly including a semitransparent back layer, an adhesive sheet in the form of a see-through free-film and a portion of the backing is see-through;

FIG. 9 is a perspective view of a semitransparent, cholesteric liquid crystal writing device of the disclosure which employs a display subassembly including a semitransparent back layer, an adhesive sheet in the form of a see-through tape and a portion of the backing is see-through;

FIGS. 15A and 15B are schematic side views showing manufacture of the liquid crystal writing device in which the free film adhesive layer has a release liner removed and is adhered to the backing (FIG. 15A) to form the backing subassembly; and in which the release liner is removed from the free film of the backing subassembly and the display subassembly is adhered to the backing subassembly (FIG. 15B);

FIG. 17A is a side view of an eWriter of this disclosure, which employs a free film adhesive, illustrating a mechanical clamp structure for securing the periphery of the display subassembly adhered to the backing, and a surrounding casing, and FIG. 17B is an enlarged view thereof which only shows a portion of the display subassembly and backing for clarity purposes; and FIG. 18A is a side view of an eWriter of this disclosure, which employs a tape adhesive, illustrating a mechanical clamp structure for securing the periphery of the display subassembly adhered to the backing, and a surrounding casing, and FIG. 18B is an enlarged view thereof which only shows a portion of the display subassembly and backing for clarity purposes.

Figure 3:
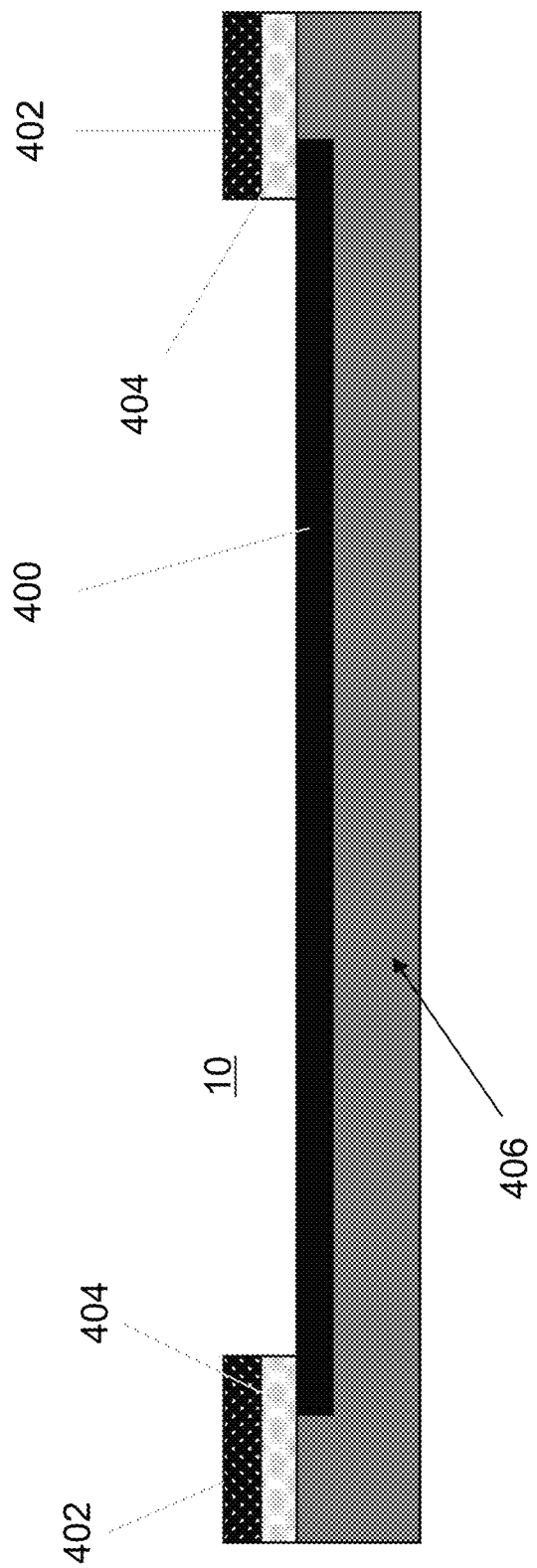
FIG. 3 is a side view of a Prior Art cholesteric liquid crystal writing device, showing the overall construction in more detail.
Figure 4A:
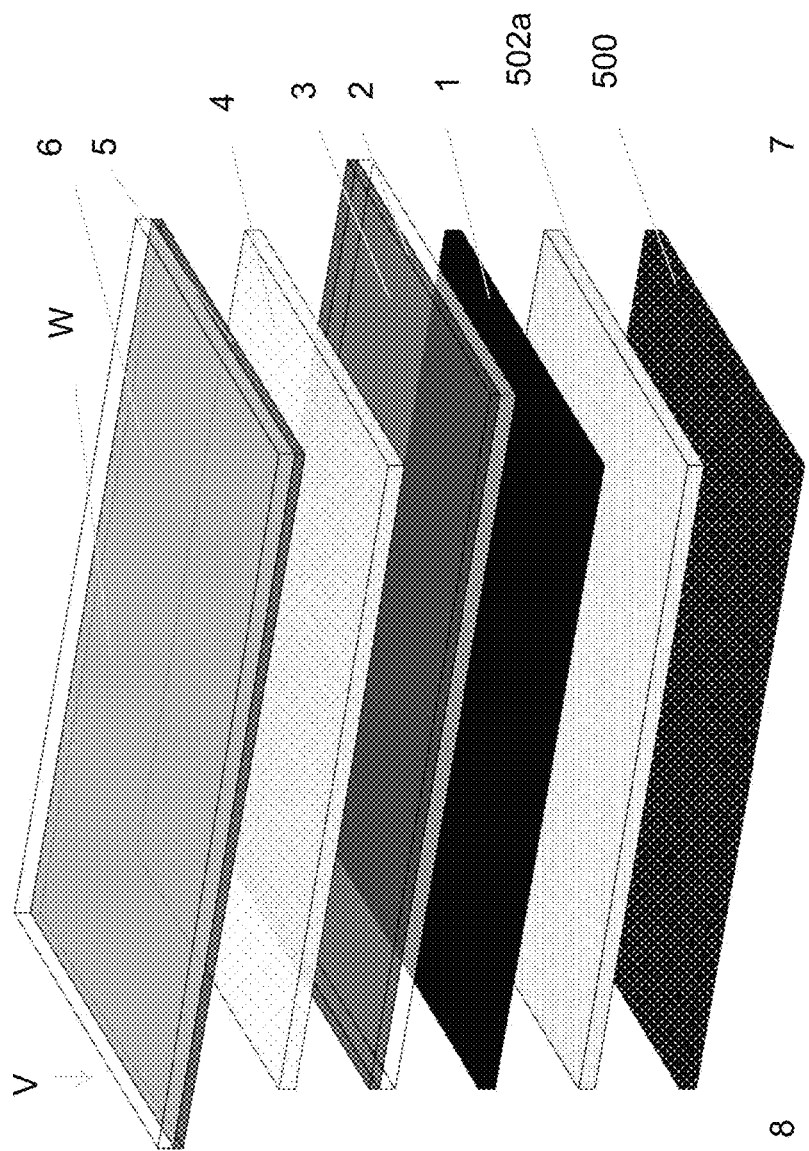
FIG. 4A is a perspective front view of a cholesteric liquid crystal writing device of the disclosure, which employs an adhesive sheet in the form of a free-film
Figure 4B:
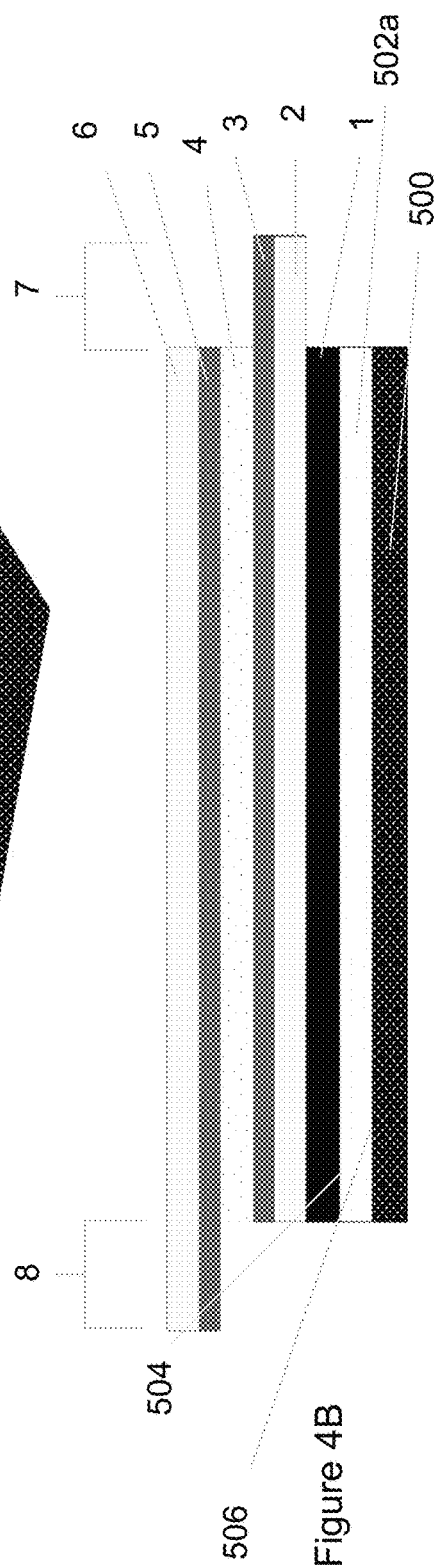
FIG. 4B is a side view thereof.
Figures 5A, 5B:
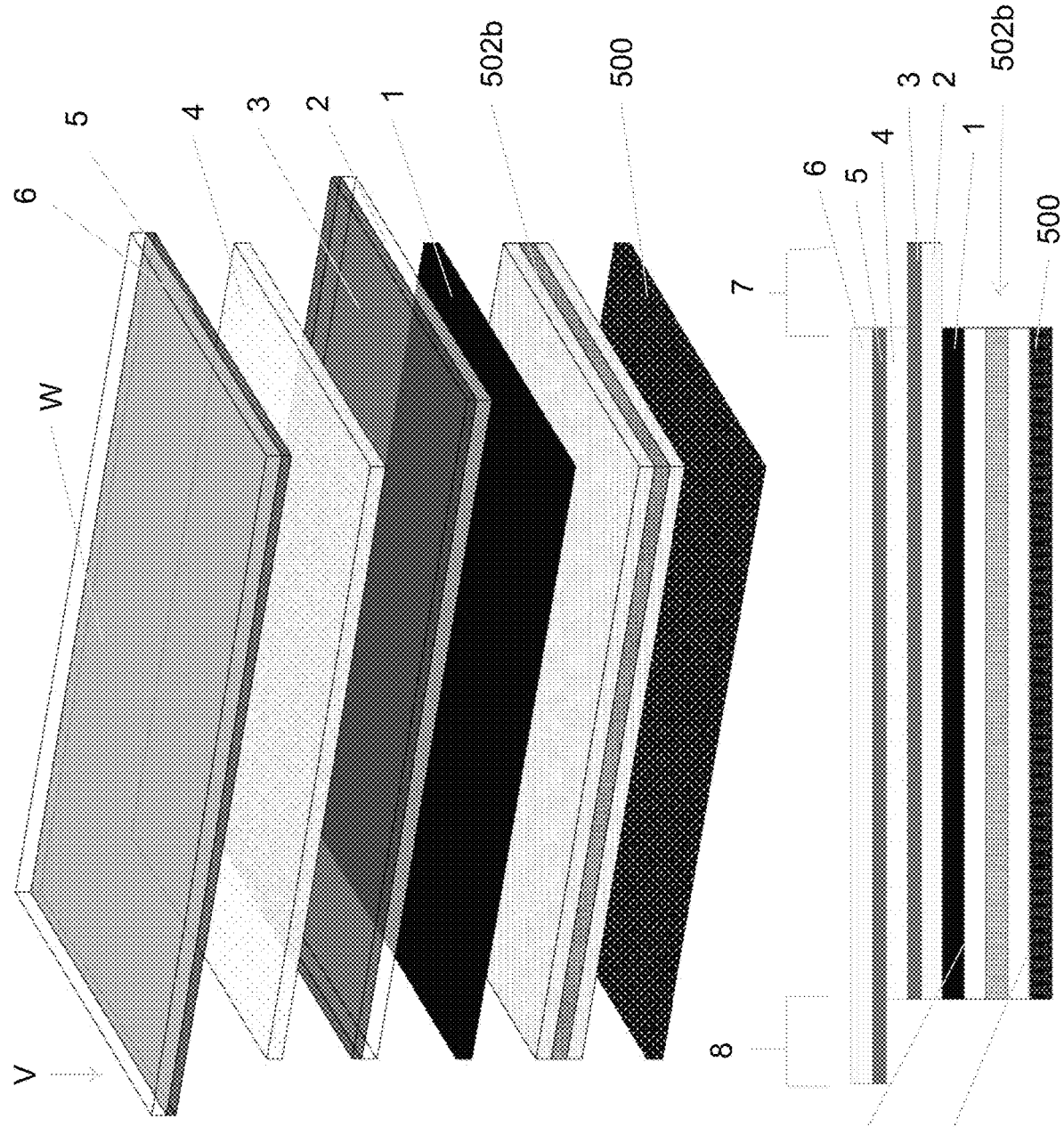
FIG. 5A is a perspective front view of a cholesteric liquid crystal writing device of the disclosure, which employs an adhesive sheet in the form of a tape
FIG. 5B is a side view thereof.

Further features described in the Detailed Description below may be applied to all aspects of the disclosure, including to the specific features, described above in any combination.

DETAILED DESCRIPTION

Like reference numbers indicate similar parts throughout the several views of this disclosure. Turning now to the drawings, FIGS. 4A, 4B and FIGS. 5A, 5B show liquid crystal writing devices or eWriters made in accordance with this disclosure, which include the following components. A front writing surface W including a front substrate 6 is provided. A liquid crystal layer 4 includes a dispersion of cholesteric liquid crystal and polymer. A reflectance of the cholesteric liquid crystal changes in response to pressure applied to the front writing surface W so as to form an image on the liquid crystal layer. Front and back electrically conductive layers 5, 3 are provided, between which the liquid crystal layer 4 is disposed. Optional spacers or other structure may be provided to set a gap between the electrically conductive layers 5, 3. A light absorbing layer 1 absorbs light passing through the liquid crystal layer 4, providing suitable contrast for the image on the liquid crystal layer. The image on the liquid crystal layer can be seen through the front writing surface W and the upper electrically conductive layer 5. A backing 500 supports the pressure applied to the front writing surface W. An adhesive sheet in the form of a free-film 502$a$ (FIGS. 4A, 4B) and a tape 502$b$ (FIGS. 5A, 5B), is disposed between the light absorbing layer 1 and the backing 500, wherein the adhesive sheet includes opposing adhesive surfaces 504, 506, at least one of which is exposed after removal of at least one release liner. The adhesive sheet 502$a$ or 502$b$ has a suitable thickness, for example, at least one mil, and in particular, at least 2 or 3 mils. In FIGS. 4A, 4B and FIGS. 5A, 5B the light absorbing layer 1 is opaque, and the back electrically conductive layer 3, the adhesive layer 502a or 502b and the backing 500 need not be see-through but can be, for example, opaque.

More specifically, the light absorbing layer 1 is placed on or adjacent to the back, optionally transparent substrate 2, which is coated on its other surface with the back electrically conductive layer 3 that is optionally transparent. The liquid crystal layer 4 includes a cured dispersion of cholesteric liquid crystal and polymer, and the spacers are disposed in the gap between the electrically conductive layers 5 and 3. The writing surface W includes a transparent front substrate 6 that is coated on an inner surface with the front transparent electrically conductive layer 5. While the term "transparent" is used to describe the front substrate (and any layers above that) and the front electrically conductive layer, and in some cases the back electrically conductive layer, back substrate, adhesive sheet and at least a portion of the backing, it should he appreciated that the eWriter should not be construed to be limited to optically transparent layers, and can employ components that enable the image on the liquid crystal layer, and any optional article or back pattern, to be seen through them. Moreover, although the disclosure refers to an image on the liquid crystal layer formed by applying pressure to the writing surface that changes liquid crystal reflectance, this image may be affected by other components of the device, including, but not limited to patterns or indicia formed on the front substrate, the electrically conductive layers, the light absorbing layer (e.g., a back semitransparent layer), and a back pattern or article seen through the semitransparent layer.

The side of the front substrate 6 not coated by the front electrically conductive layer 5 forms the writing surface W proximal to a viewer V of the device (the viewer V looking in a general direction of the arrow). A viewer V uses a stylus or fingernail to form an image on the eWriter by applying pressure to the writing surface W. Of course, there may be multiple viewers, not all of which may write on the eWriter. Optional transparent layers can be used on the upper substrate 6 to form the writing surface W, for example, antiglare or scratch resistant coatings or films. The front and back substrates are extended to create the back ledge 7 and the front ledge 8. The electrically conductive layers 3 and 5 are exposed on the ledges 7 and 8, respectively, for connecting to erase electronics so that an erase voltage or at least one erase voltage pulse may be applied across the electrically conductive layers 3 and 5 appropriate to initialize or fully erase an image on the pressure sensitive liquid crystal device as disclosed in, for example, U.S. patent application Ser. No. 15/952,471, entitled "Liquid Crystal Writing Device With Slow Discharge Erase," and U.S. Pat. No. 8,228,301 and for select erase of the image as described in U.S. Pat. No. 8,139,039, which are incorporated herein by reference in their entireties. The electrodes 5, 3, may be patterned, such as in orthogonal rows and columns. In another aspect the electrodes are continuous across a majority of or the entire writing surface.

The cholesteric liquid crystal in liquid crystal layer 4 can be confined or unconfined interconnecting droplets prepared by emulsification, polymerization induced phase separation, temperature induced phase separation, solvent evaporation phase separation, or by flow reducing features in between the electrically conductive layers 3 and 5.

As known in the art, the maximum light reflectivity of the eWriter is achieved by the planar texture whereas the minimum light reflectivity of the eWriter is achieved by the focal conic texture. The color reflected by the cholesteric liquid crystal can be tuned using the formula $$\lambda_{max} = \frac{\bar{n}}{\phi HTP},$$

where, $\lambda_{max}$ is the desired peak reflectivity wavelength, $\bar{n}$ is the average refractive index of the nematic liquid crystal molecules used, $\phi$, is the concentration of the chiral dopant molecule used to induce a uniform twist in the nematic liquid crystal so that it can Bragg reflect, and HTP is the Helical Twisting Power of the chiral dopant.

The front writing surface of the eWriter may have a surface area, for example, of at least 0.75 ft$^2$ and, more specifically, a surface area of at least 6 ft$^2$. The eWriter can form thick reflective lines on it of at least 1.5 mm wide, in particular 2-3 mm wide. The eWriters of this disclosure can be designed to be more pressure sensitive than the Boogie Board® eWriters currently on the market which forms lines on the order of 1 mm wide or less. This pressure sensitivity of the eWriters, can be increased as known in the art (e.g., see US 2009/0033811 which is incorporated herein by reference in its entirety), such as by reducing the concentration of polymer in the dispersion layer. All eWriters of this disclosure may be designed to form thick lines that are at least 1.5 mm wide, in particular 2-3 mm wide, including hand held and large format sizes. The eWriter has a structure that maintains the dispersion layer flat, even in a large format device, and its writing surface or screen can have various shapes including, but not limited to, square and rectangular.

Figure 6:
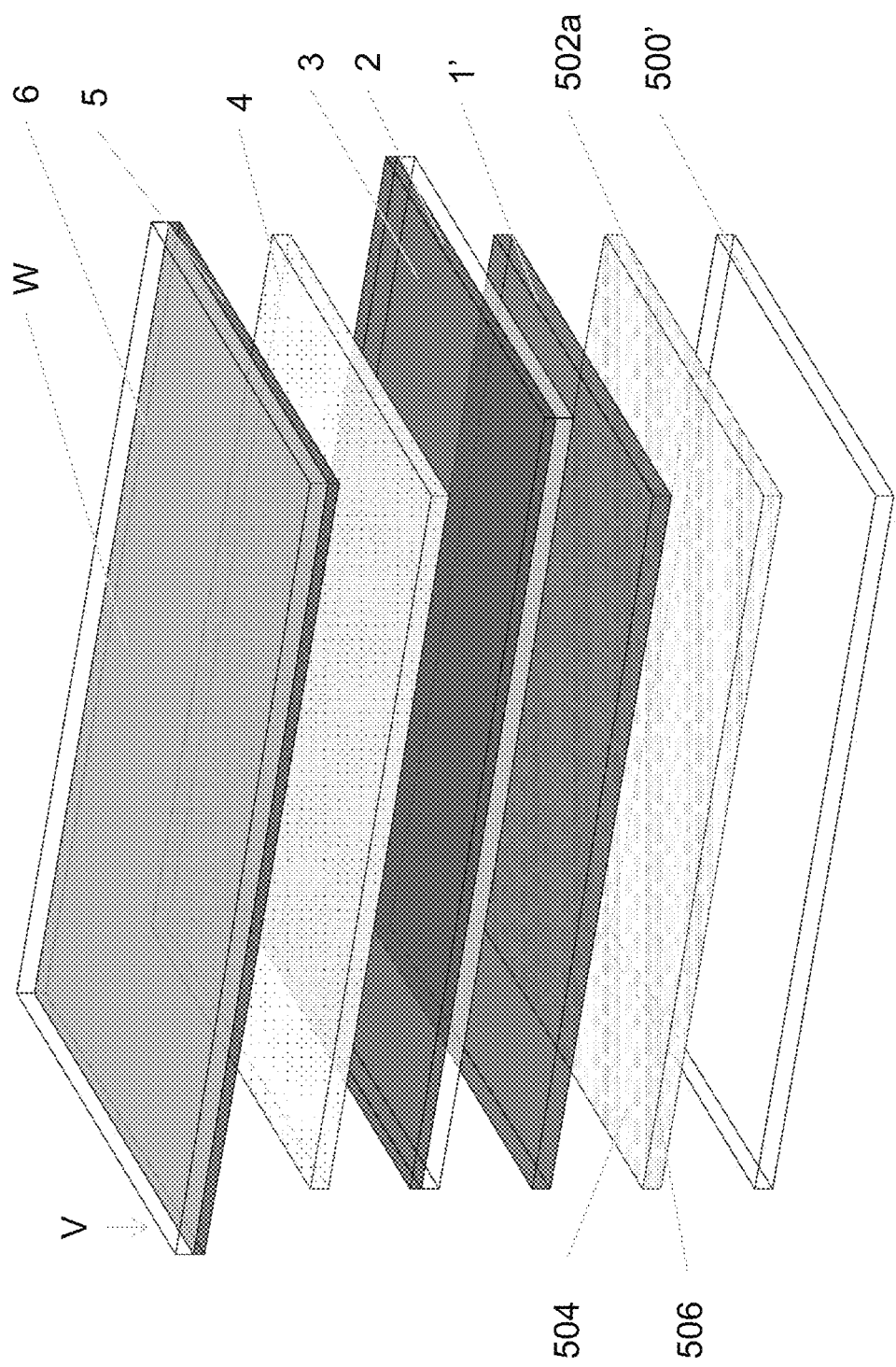
Figure 7:
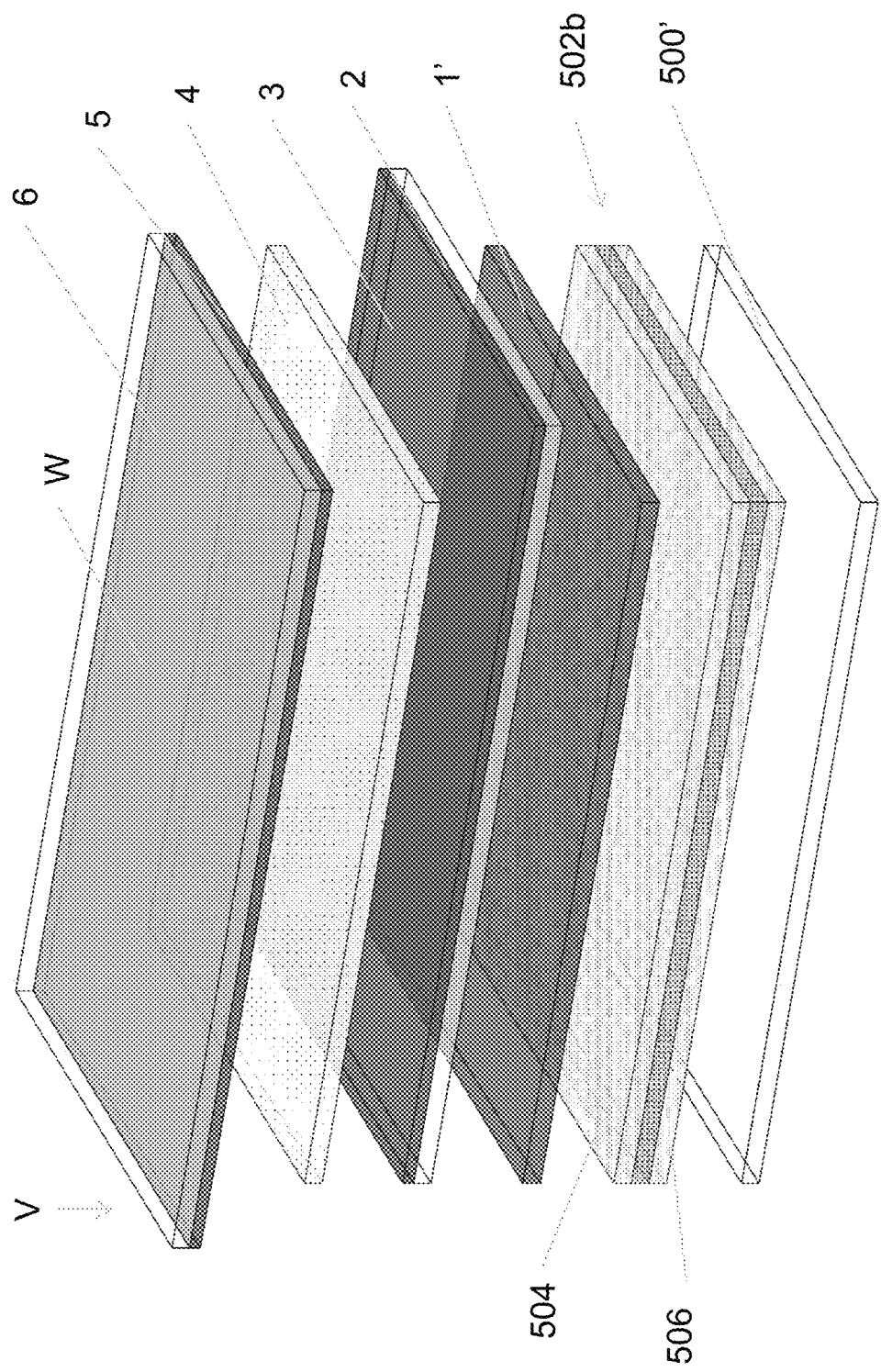

FIGS. 6 and 7 show semitransparent eWriters made according to this disclosure. The semitransparent eWriters of FIGS. 6 and 7 are similar in construction to the eWriters shown in FIGS. 4 and 5, respectively, except for a see-through design of the semitransparent eWriters. The eWriters of FIGS. 4 and 5 include an opaque light absorbing layer 1. FIGS. 6 and 7 show the light absorbing layer in a form of a semitransparent back layer 1' as described in U.S. Pat. No. 9,116,379, entitled "Electronic Display with Semitransparent Back Layer," which provides suitable contrast while permitting articles behind the eWriter to be seen. The semitransparent back layer 1' absorbs light that passes through the liquid crystal layer 4, reflects grey light or light of a color and is light transmitting. Below the semitransparent back layer 1', the adhesive sheet film 502a (FIG. 6) or the adhesive sheet tape 502b (FIG. 7) and the backing 500', sharing surface area with the front writing surface W, are also see-through, making the semitransparent eWriter see-through. The substrates and the electrically conductive layers are also see-through in a see-through eWriter. This enables back patterns including templates and displays to be placed behind and seen through the semitransparent eWriter as disclosed in the U.S. Pat. No. 9,116,379 patent, similar to FIG. 2A. Although the liquid crystal writing device components are shown as completely see-through in FIGS. 6 and 7, this is not required as it may be suitable for only certain portions of the components to be see-through.

The back patterns of the semitransparent eWriter can be selected from the group consisting of a template of a sports field, court or arena, a pattern for a children's game, an image for children to color, notepad lines, graph paper lines, or a menu of items that one can choose from. In another aspect the back pattern comprises a waveguide including light sources disposed at an edge thereof, and light emitting portions on a surface of the waveguide enabling light to leave the waveguide in a pattern. In yet another aspect the back pattern comprises an emissive, backlit or reflective display device for displaying images. The back pattern can be formed as a template with dot patterns or indicia enabling a function to be performed on a remote processing device when read by a special stylus, as disclosed in the US 2015/0124178 publication, entitled "Electronic Writing Device with Dot Pattern. Recognition System." The user of the eWriter can thus trace back patterns, utilize the back patterns as a guide when writing, such as in the case of templates with lines, graphs or sports fields or courts, color in features of a coloring book page type template, and the like, using the semitransparent eWriters. It is believed this is the first disclosure of a large format, semitransparent eWriter, or thicker line eWriter, of its kind, which exhibits the sharp line acuity.

Figure 8:
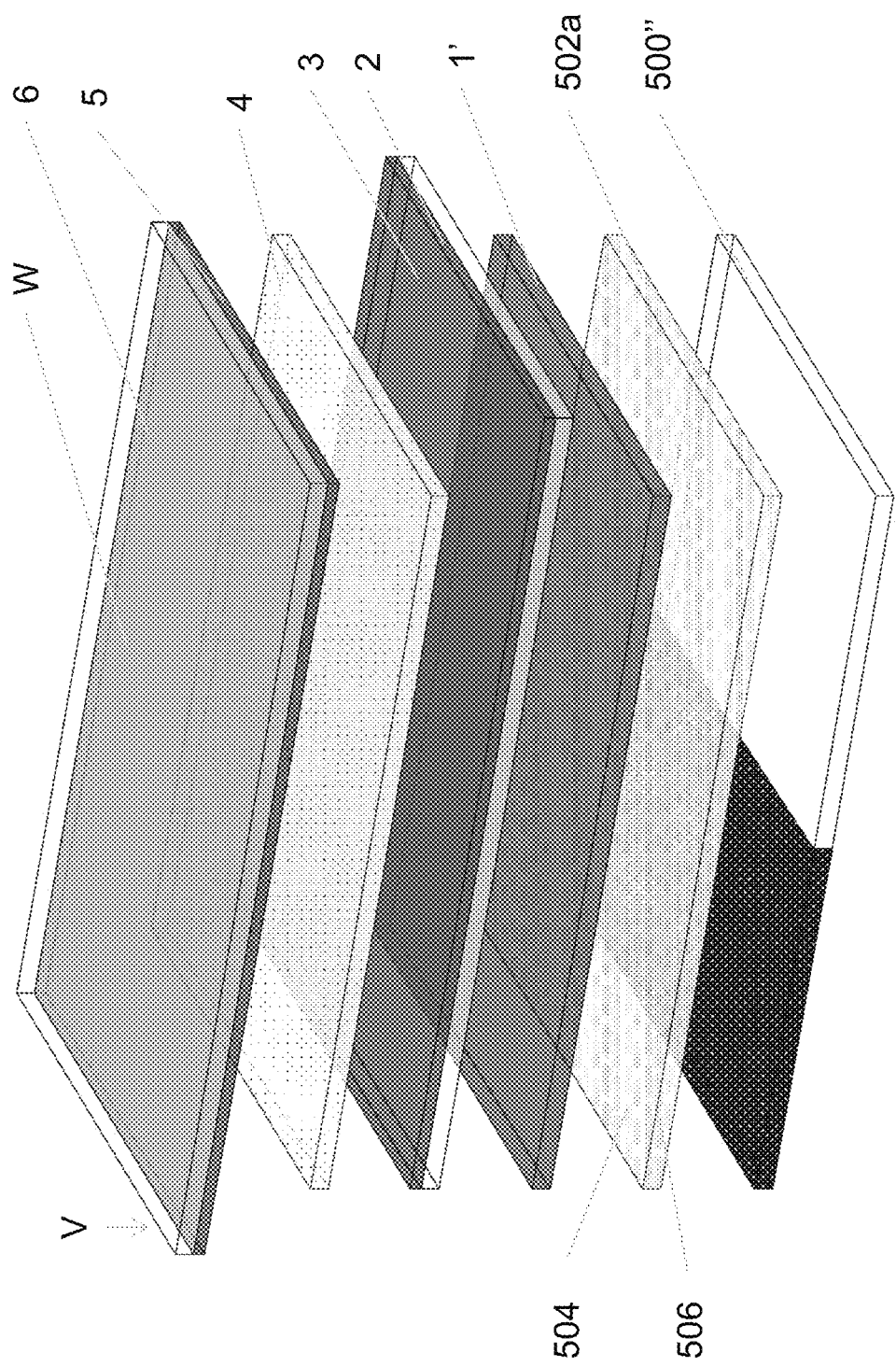
Figure 9:
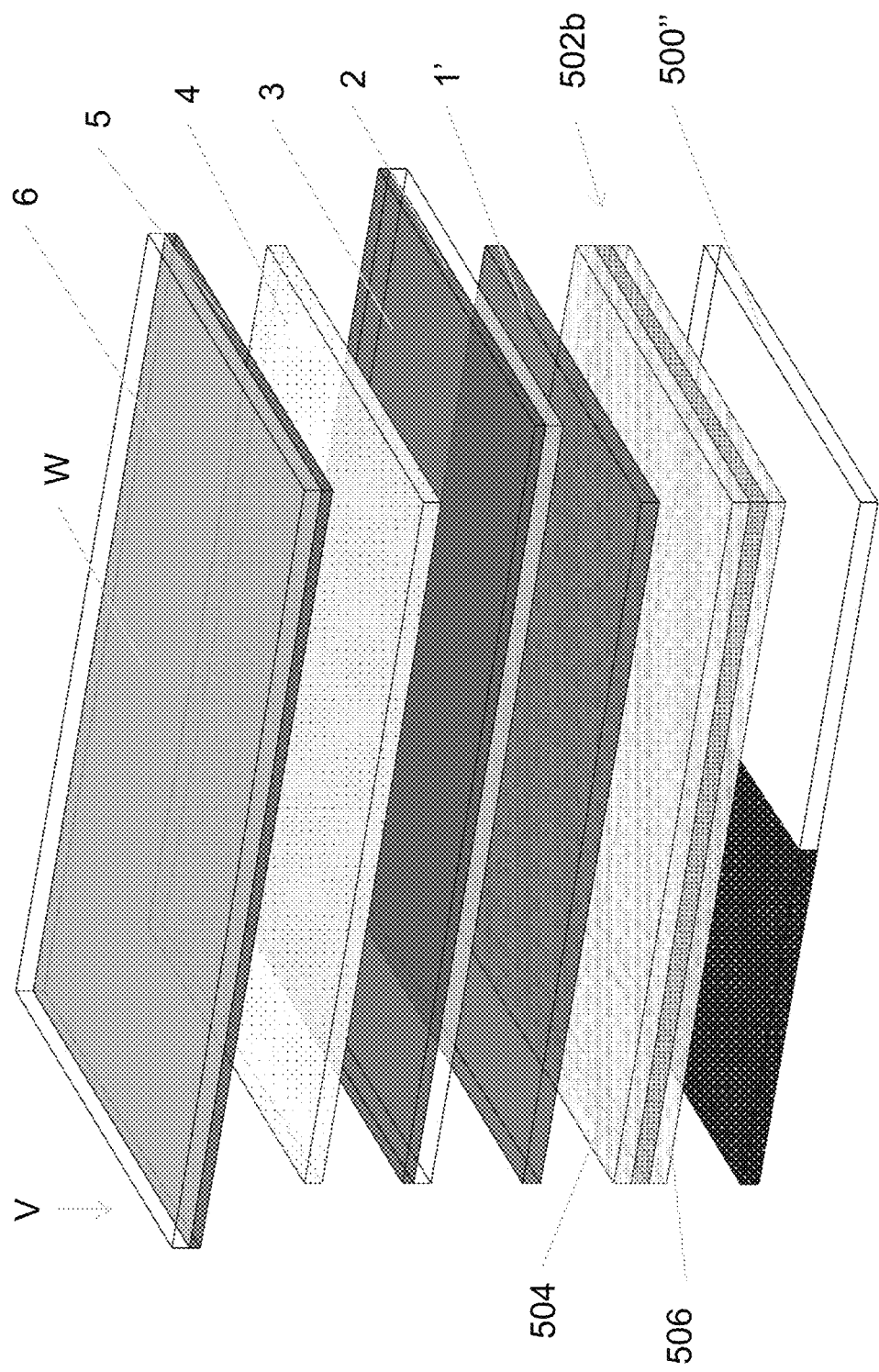

FIGS. 8 and 9 are perspective views of semitransparent, cholesteric liquid crystal writing devices of the disclosure which employ a display subassembly including a semitransparent back layer 1', and an adhesive sheet in the form of a see-through free-film 502a or see-through tape 502b, respectively. The liquid crystal writing devices of FIGS. 8 and 9 are the same that of FIGS. 6 and 7, respectively, except that only a portion of the backing 500" is see-through. Another portion of the backing 500" may be opaque. This can be advantageous, for example, in that a smaller template can be placed behind the see-through part of the backing 500", sharing a surface area with the front writing surface. The semitransparent back layer 1' would provide suitable contrast for the image on the liquid crystal layer 4, while permitting the template to be seen through the see-through part of the backing 500". The opaque part of the backing 500" would be effective to provide suitable contrast for the image on the liquid crystal layer 4. No image or object would be viewed behind the opaque part of the backing 500". It will be appreciated by persons having ordinary skill in the art that any or all layers of the liquid crystal writing devices of this disclosure may be see-through (both above and below the liquid crystal layer and including the liquid crystal layer). Moreover, various identifiers, patterning and indicia may be employed throughout components of the liquid crystal writing device as would be apparent to those skilled in the art as disclosed in U.S. Pat. Nos. 9,851,612 and 9,235,075, which are incorporated herein by reference in their entireties. A see-through portion of the backing may have any size or shape. For example, the see-through portion of the hacking can take the form of an area around an opaque logo, for example.

Figure 10:
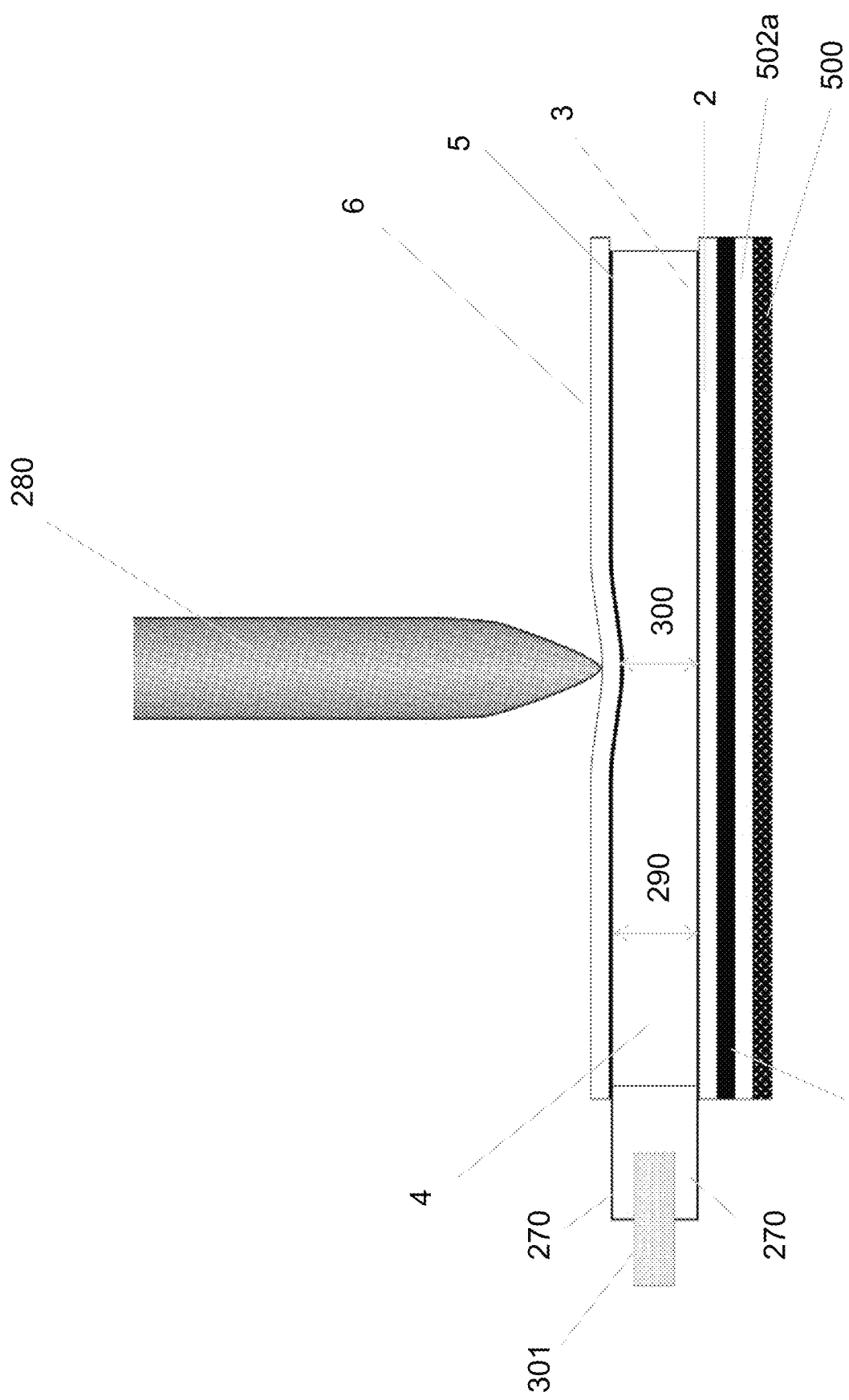
FIG. 10 is a side view of the liquid crystal writing device of FIG. 4 (free-film adhesive sheet) during a writing operation.
Figure 11:
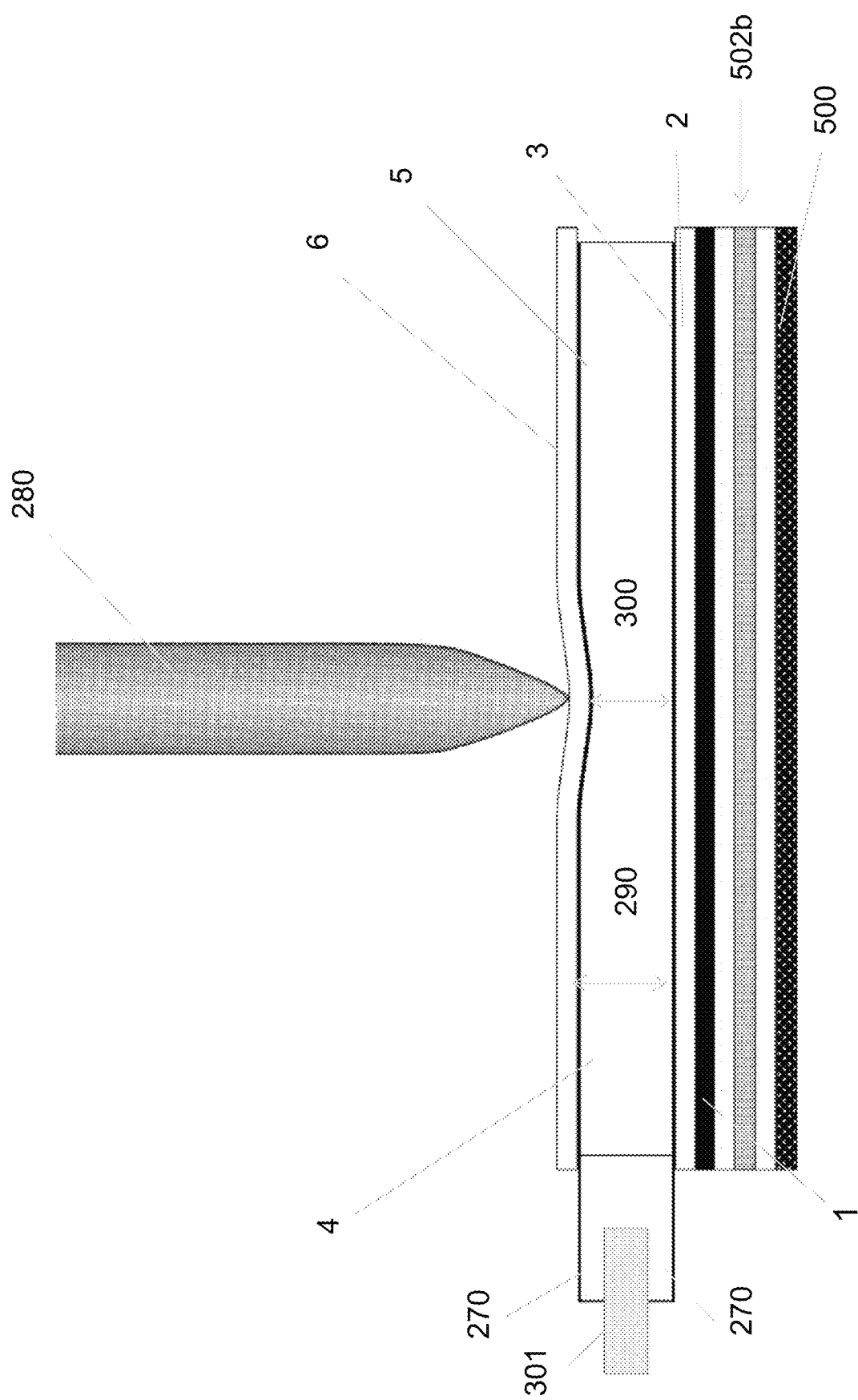
FIG. 11 is a side view of the liquid crystal writing device of FIG. 5 (tape adhesive sheet) during a writing operation.

With regard to operation of the liquid crystal writing device, FIGS. 10 and 11 are side views of an eWriter with the free film adhesive sheet 502a (FIGS. 4A and 4B) and an eWriter with the tape adhesive sheet 502b (FIGS. 5a and 5B), showing the liquid crystal layer 4 with a region of unreduced cell gap 290 and reduced cell gap 300 due to the pressure from the stylus 280. The conducting electrodes 3 and 5 are connected with electrical interconnects 270 to electronic erase (and optional write) circuitry 301 that provides a suitable voltage across the electrically conductive layers or electrodes 3, 5, usually in the form of at least one voltage pulse. Pressure from the stylus 280 is applied to create an image. Applicant does not intend to by bound by theory in regards to cell gap change or pressure and its effect on the cholesteric liquid crystal and its optical behavior. The extent by which the cell gap may or may not change is only shown in the drawings for purposes of explaining that pressure is being applied to the liquid crystal layer to form the image, and should not be used to limit the scope of the subject matter of this disclosure to a particular decrease in cell gap or effect thereof.

The images of the eWriters of this disclosure are formed in a manner similar to that shown in the top view of the eWriter in Mode B of FIG. 1. The procedure of writing an image is to first erase all previous images by applying a suitable erasing voltage pulse to drive the entire cell initially to the focal conic texture 56 (FIG. 1). The value of the voltage or magnitude of a voltage pulse to do this is well known in the art of making cholesteric liquid crystal displays e.g., U.S. Pat. Nos. 5,453,863 and 5,691,795, both patents which are incorporated herein by reference. The cholesteric liquid crystal in the focal conic state 56 is substantially transparent and reveals the light absorbing layer. While not wanting to be bound by theory it is believed the pressure from the stylus 280, without further application of voltage, induces flow that causes the cholesteric liquid crystal to reorient to the bright planar texture 55, having a reflectance and color as known in the art, which contrasts with the background. The user of the eWriter can cause the liquid crystal of the viewing area to be switched back to the focal conic texture (i.e., initialized or erased) by applying the erase voltage pulse again.

Line Acuity Measurement Method

The Line Acuity Measurement Method measures the sharpness or jaggedness of a written line on a pressure sensitive eWriter. It utilizes an automated writing system, scanner, and image analysis program to control the parameters that could affect the resulting measurement value.

Writing

To write the line on the eWriter, a 155g stylus rod with a 3 mm diameter tungsten carbide ball tip was fastened to the moving arm of a Fisnar 4400N dispensing robot. The eWriter was placed on an acrylic platen underneath the stylus. The stylus drew a 100 mm long line at a speed of 75 mm/s.

Image Capture

Figure 12B:
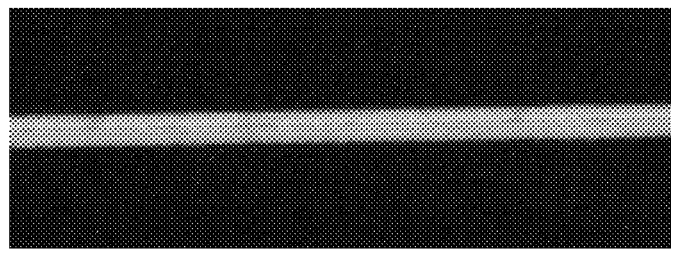
FIGS. 12A and 12B compare the written reflective lines formed on Comparative and Example eWriters referred to in FIGS. 14A and 14B, respectively, as achieved in the Line Acuity Measurement Method discussed below, wherein the Comparative eWriter (FIG. 12A) exhibits poor line acuity and the Example eWriter (FIG. 12B) exhibits enhanced line acuity.
Figure 12A:
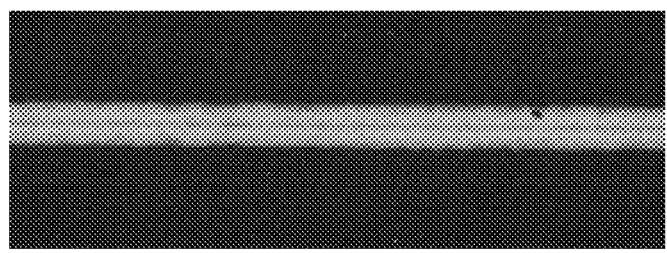

After the line was written, the image was captured using an Epson Perfection 4490 Photo scanner. The image was scanned as an 8-bit grayscale image at 600 dpi. An Example of the scanned image for an eWriter according to this disclosure is seen in FIG. 12B. A Comparative Example of the scanned image of a Comparative prior art large format eWriter, is shown in FIG. 12A.

Image Analysis

For the image analysis, only the middle three inches of the line were analyzed in order to exclude the beginning and end of the line where the stylus was not at constant speed.

Figure 13:
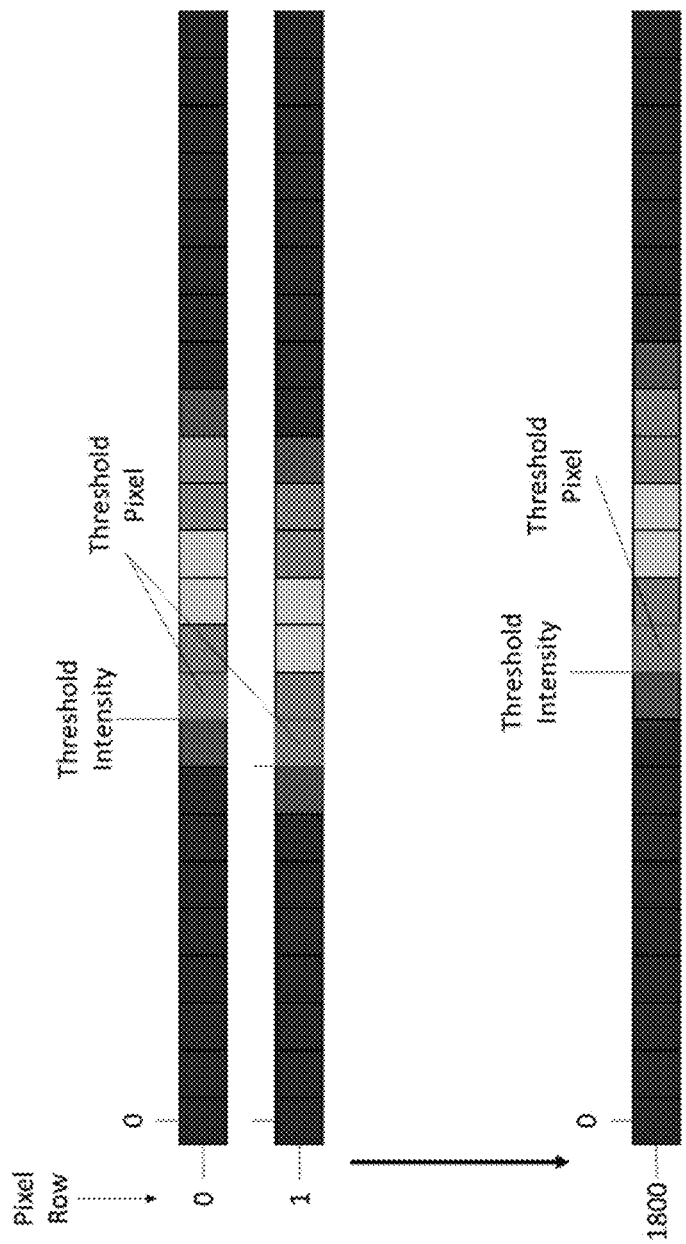
FIG. 13 is a simplified sketch explaining an image analysis algorithm used in the Line Acuity Measurement Method discussed below.

Referring to FIG. 13 a simplified sketch explaining an image analysis algorithm is shown. The image analysis algorithm scans 1800 consecutive rows of pixels that are perpendicular to the writing direction, searching the intensity profile of each line of pixels for the first pixel that is above a certain threshold intensity (Threshold Pixel).

The threshold intensity ($I_T$) is defined as 30% of the intensity range ($I_{Max}-I_{Min}$) present in the entire image.

$$I_T=0.30(I_{Max}-I_{Min})$$

Figure 14A:
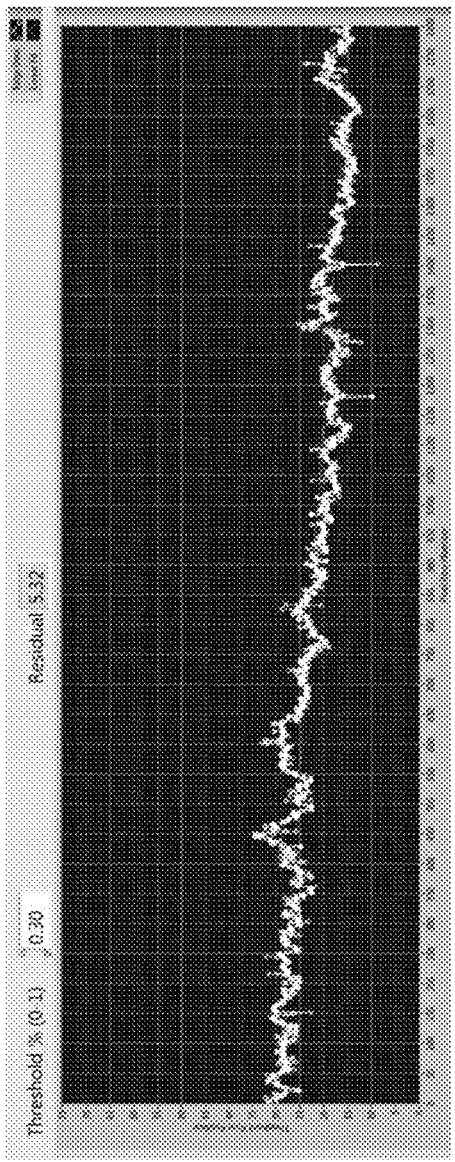
FIGS. 14A and 14B show graphs in which threshold pixel position is plotted versus the pixel row number for the Comparative eWriter and the Example eWriter, respectively, with regard to the Line Acuity Measurement Method discussed below.

Once the threshold pixel is found for each row, the threshold pixel position is plotted versus the pixel row number as shown in the plots in FIGS. 14A (Comparative) and 14B (Example).

The threshold pixel position versus pixel row number data is then fitted with a linear fit. The line acuity is quantified by calculating the residual or deviation from the linear fit using the Least Square method:

$$\text{residual} = \frac{1}{N}\sum_{i=0}^{N-1}(f_i - y_i)^2$$

Where N is the number of pixel rows analyzed, $f_i$ is the best linear fit threshold pixel position for the $i^{th}$ row of pixels, and $y_i$ is the actual threshold pixel position for the $i^{th}$ row of pixels.

Figure 14B:
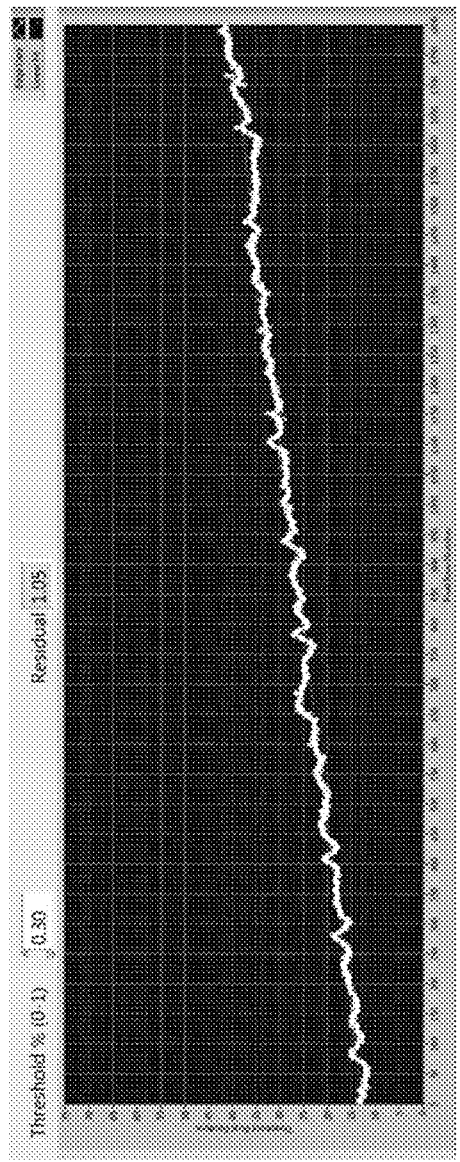

A high residual indicates a fuzzy or contoured edge while a low residual indicates a sharp, straight edge. For the plotted line in FIG. 14B (corresponding to the reflective reference line formed on the Example eWriter represented by FIG. 12B), the residual of the plotted line is 1.05. The plotted line of FIG. 14A (corresponding to the reflective reference line formed on the Comparative eWriter represented by FIG. 12A) has a residual of the plotted line that is 5.32. Visual inspection of the reflective reference lines formed on the eWriters as shown in FIGS. 12A and 12B confirm that the Example reflective line of the Example eWriter of this disclosure (FIG. 12B) has enhanced line acuity whereas the Comparative reflective line of the Comparative eWriter has poor line acuity (FIG. 12A).

It would be appreciated by persons having ordinary skill in the art that use of the term reflective reference lines does not require these actual lines to be formed on the eWriter during normal use, or the conditions for forming these lines to occur in normal use. Instead, the reflective reference lines discussed in the disclosure are presented to explain the enhanced line acuity of the eWriters of this disclosure under specific conditions of the Line Acuity Measurement Method, enabling comparing the line acuity of eWriters.

One implementation of the eWriter uses the adhesive layer in a form of a free-film PSA construction including a PSA covered by two silicone release liners, wherein the opposing adhesive surfaces have differential release properties of the release liners. In an example process of making the eWriter the first release liner (lower peel strength) is peeled first (FIG. 15A), exposing one side of the PSA. The exposed PSA is laminated to the backing, forming a backing subassembly in which the second release liner faces up. This is illustrated, for example, in a continuous roll to roll process in which the peeling of the first release liner and laying of the PSA on the backing happen close together in time. The second release liner (higher peel strength) is peeled off the backing subassembly next (FIG. 15B), exposing the PSA. Finally, the multilayer display subassembly (e.g., including liquid crystal layer, electrically conductive layers, at least one substrate and light absorbing layer) is laminated to the exposed adhesive of the backing subassembly. Again this is illustrated, for example, in a continuous roll to roll process in which the peeling of the second release liner and laying of the display subassembly on the backing subassembly happen close together in time. Finally, other device components including electronic circuitry, battery and switches are added and the assembly is secured at its periphery with a mechanical clamping structure 510, which is covered by an extruded frame or casing 512, forming the completed eWriter, as shown in FIGS. 17A and 17B.

Figure 16B:
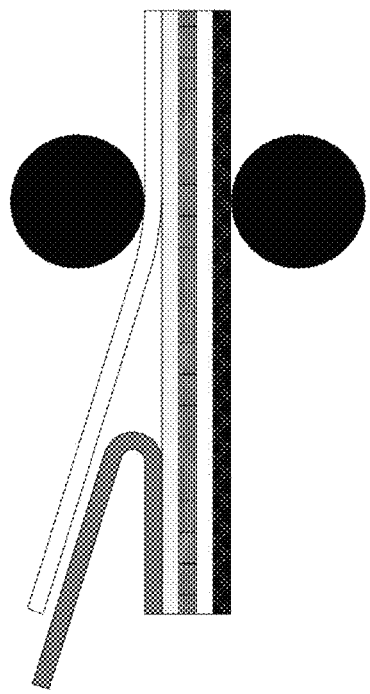
FIGS. 16A and 16B are schematic side views showing manufacture of the liquid crystal writing device in which the tape adhesive layer has a release liner removed and is adhered to the backing (FIG. 16A) to form the backing subassembly; and in which the release liner is removed from the tape of the backing subassembly and the display subassembly is adhered to the backing subassembly (FIG. 16B)
Figure 16A:
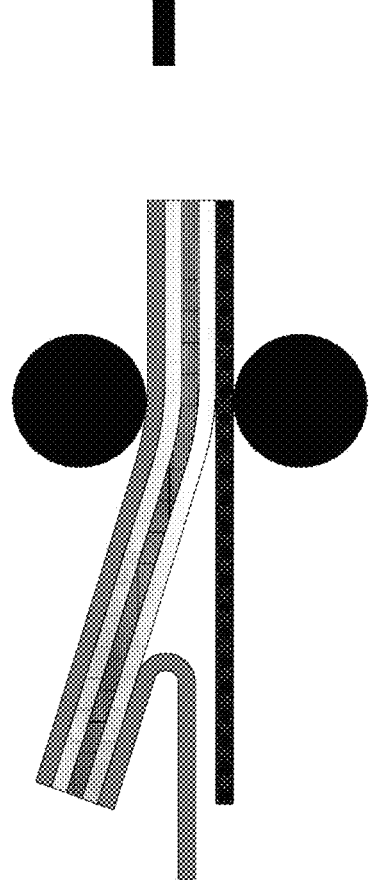

A process for implementing the adhesive sheet as a tape construction, employs a carrier film coated with adhesive on both sides. In this lamination method, the tackier adhesive (layer with higher level of adhesiveness) is laminated to the surface of the backing leaving the lesser tack adhesive facing up toward the multilayer display subassembly. The multilayer display subassembly is typically laminated to the lesser tack side using a laminator. This puts the light absorbing layer into contact with the lesser tack front facing adhesive layer of the tape of the back subassembly and the backing in contact with the higher tack adhesive layer of the tape. In an example process the release liner is removed from the higher tack adhesive layer of the tape (FIG. 16A) and the tape is laminated to the backing, forming a backing subassembly. This is illustrated, for example, in a continuous roll to roll process in which the peeling of the first release liner and laying of the tape on the backing happen close together in time. Next the release liner is removed from the lower tack adhesive layer and the display subassembly is laminated to the backing subassembly (FIG. 16B). Again this is illustrated, for example, in a continuous roll to roll process in which the peeling of the second release liner and laying of the display subassembly on the backing subassembly happen close together in time. Finally, other device components including electronic circuitry, battery and switches are added and the assembly is secured at its periphery with a mechanical clamping structure 510, which is covered by to an extruded frame or casing 512, forming the completed eWriter, as shown in FIGS. 18A and 18B.

The specific lamination technique depends on which type of adhesive is being used. For instance, for the lesser tack adhesive, the display subassembly is laminated to the backing from one end to the other. The display subassembly does not come in contact with the adhesive until it passes through the nip. In another aspect the display subassembly can be draped over the backing and then run through the laminator, pushing the air out from between the display subassembly and the adhesive layer.

While not wanting to be bound by theory, the texture of the PSA is believed to affect the acuity of the reflective line written on the eWriter by pressure. An evaluation of PSAs can be done by eye. An optically clear PSA having a coarse texture may cause the written reflective line to look wavy, whereas an optically clear PSA having a smooth texture, may cause the written line to look sharper. Evaluation of adhesive layers, including optically clear PSAs, in this manner, can lead to one of ordinary skill to design an eWriter with enhanced line acuity according to this disclosure, without excessive experimentation. The eWriter of this disclosure could also be designed to have more pressure sensitivity than a Boogie Board® eWriter, in a manner that would be apparent to one of ordinary skill in view of this disclosure, such as by reducing the concentration of polymer in the dispersion of liquid crystal and polymer, so as to achieve a thicker line having a width of at least 1.5 mm, and in particular, having a width of 2-3 mm. This would be suitable, for example, for use in a large format eWriter, enabling viewers at farther distances to easily read the thicker lines written on the eWriter.

The subject matter of this disclosure will now be described by reference to the following non-limiting Examples.

EXAMPLES

Example 1

An eWriter prototype was constructed according to the free-film method, exhibiting a line acuity of 1.05, using 3M 8212 optically clear pressure sensitive adhesive (PSA). This free-film product was a 2 mil thick permanent acrylic PSA. The release liner on the first side was removed and the PSA was laminated to an ACP (aluminum clad plastic) backing using a GBS laminator under pressure, leaving the release liner for the second side facing up on top of the backing subassembly. The release liner was peeled from the second side of the PSA and the display subassembly was laminated to the backing subassembly using the GBS laminator (i.e., the light absorbing layer contacted the second side of the PSA).

Example 2

An eWriter prototype was constructed according to the tape method, exhibiting a line acuity of 1.06, using Catalina Graphics CMTT100PR-OC removable PSA. This tape product had a 1 mil PET carrier film with 1 mil thick "permanent" (65 oz/in) acrylic PSA on one side and 1 mil thick "removable" (6 oz/in) acrylic PSA on the other. The terms "permanent" and "removable" only pertain to the relative degree of the adhesiveness. The release liner was peeled from the permanent side of the tape which was laminated to an ACP (aluminum clad plastic) backing layer using a GBS laminator under pressure, leaving the removable side of the tape facing up, thereby forming a backing subassembly. The release liner was peeled from the removable side of the backing subassembly and the display subassembly was laminated to the backing subassembly using the GBS laminator (i.e., the light absorbing layer contacted the second side of the PSA).

Many modifications and variations of the disclosed embodiments will be apparent to those of ordinary skill in the art in light of the foregoing disclosure. Therefore, it is to be understood that, within the scope of the appended claims, the invention can be practiced otherwise than has been specifically shown and described.

What is claimed is:

1. A liquid crystal writing device with enhanced line acuity, comprising:
   a front writing surface;
   a liquid crystal layer including a dispersion of cholesteric liquid crystal and polymer, wherein a reflectance of said cholesteric liquid crystal changes in response to pressure applied to said front writing surface so as to form an image on said liquid crystal layer;
   electrically conductive layers between which said liquid crystal layer is disposed, wherein a second of said electrically conductive layers is more distal from said front writing surface than a first of said electrically conductive layers is from said front writing surface;
   a backing that supports the pressure applied to said front writing surface; and
   an adhesive layer that is disposed between said second of said electrically conductive layers and said backing;
   wherein the line acuity of the liquid crystal writing device is determined according to a Line Acuity Measurement Method comprising: applying a 155g robot driven stylus rod with a 3 mm diameter tip to the liquid crystal writing device and drawing a 100 mm long reference line at a speed of 75 mm/s, scanning to form an 8-bit grayscale scanned image at 600dpi of the reference line, analyzing the middle three inches of the scanned image of the reference line, the scanned image including 1800 consecutive rows of pixels that are perpendicular to a writing direction of the reference line, searching the intensity profile of each row of pixels for the first pixel that is above a certain threshold intensity ($I_T$) defined as 30% of the intensity range ($I_{Max}-I_{Min}$) present in the entire scanned image where $I_T$=0.30 ($I_{Max}-I_{Min}$), once the threshold pixel is found for each pixel row, plotting the threshold pixel position versus the pixel row number, fitting the plot with a linear fit, the line acuity being quantified by calculating the residual or deviation from the linear fit using the Least Square method:

$$\text{residual} = \frac{1}{N}\sum_{i=0}^{N-1}(f_i - y_i)^2$$

where N is the number of pixel rows analyzed, $f_i$ is the best linear fit threshold pixel position for the $i^{th}$ row of pixels, and $y_i$ is the actual threshold pixel position for the $i^{th}$ row of pixels;
   wherein the line acuity has a value of not more than 3.0 determined according to the Line Acuity Measurement Method.

2. The liquid crystal writing device of claim 1, wherein said line acuity has a value that is not more than 2.0.

3. The liquid crystal writing device of claim 1, wherein said line acuity has a value that is not more than 1.1.

4. The liquid crystal writing device of claim 1 comprising electronics adapted to apply a voltage or at least one voltage pulse across said electrically conductive layers that erases said image.

5. The liquid crystal writing device of claim 1 wherein said adhesive layer is a film that includes a first adhesive surface on one side thereof and a second adhesive surface on an opposite side thereof.

6. The liquid crystal writing device of claim 5 wherein said film comprises acrylic polymer and has a thickness of at least 2 mils.

7. The liquid crystal writing device of claim 1 wherein said adhesive layer is a tape comprising a carrier film, a first adhesive layer disposed on one side of said carrier film and a second adhesive layer disposed on an opposite side of said carrier film, said second adhesive layer being closer to said writing surface than said first adhesive layer.

8. The liquid crystal writing device of claim 7 wherein said carrier film has a thickness of at least one mil and comprises Polyethylene Terephthalate polymer, said first adhesive layer has a thickness of at least one mil and a first peel strength and said second adhesive layer has a thickness of at least one mil and a second peel strength, said first adhesive layer and said second adhesive layer comprising acrylic polymer and said first peel strength being at least 10 times greater than said second peel strength.

9. The liquid crystal writing device of claim 1 wherein said backing includes aluminum clad polymer.

10. The liquid crystal writing device of claim 1 wherein said image has an average line width of at least 1.5 mm.

11. The liquid crystal writing device of claim 1 wherein said image has an average line width of at least 2.0 mm.

12. The liquid crystal writing device of claim 1 wherein said front writing surface includes a front substrate and including a back substrate that supports said second of said electrically conductive layers.

13. The liquid crystal writing device of claim 1 comprising an opaque light absorbing layer that absorbs light passing through said liquid crystal layer.

14. The liquid crystal writing device of claim 1 comprising a semitransparent back layer that absorbs light passing through said liquid crystal layer.

15. The liquid crystal writing device of claim 1 wherein said front writing surface, said electrically conductive layers, said adhesive layer and said backing are see-through.

16. The liquid crystal writing device of claim 1, comprising said front writing surface having a surface area of at least 0.75 ft$^2$, and said image having an average line width of at least 1.5 mm.

17. The liquid crystal writing device of claim 16 wherein said line acuity of said image has a value of not more than 1.1 determined according to the Line Acuity Measurement Method.

18. The liquid crystal writing device of claim 16 wherein said front writing surface has an area of at least 6.0 ft$^2$.

19. The liquid crystal writing device of claim 16 comprising an opaque light absorbing layer that absorbs light passing through said liquid crystal layer.

20. The liquid crystal writing device of claim 16 comprising a semitransparent back layer that absorbs light passing through said liquid crystal layer.

21. The liquid crystal writing device of claim 16 wherein said front writing surface, said electrically conductive layers, said adhesive layer and said backing are see-through.

22. The liquid crystal writing device of claim 16 wherein said front writing surface includes a front substrate and including a back substrate that supports said second of said electrically conductive layers.

23. The liquid crystal writing device of claim 16 comprising electronics adapted to apply a voltage or at least one voltage pulse across said electrically conductive layers that erases said image.

\* \* \* \* \*